(12) United States Patent
Bohringer et al.

(10) Patent No.: US 10,125,409 B2
(45) Date of Patent: Nov. 13, 2018

(54) METHOD AND PLANT FOR PROCESSING ROASTED PYRITES

(71) Applicant: Blucher Gmbh, Erkrath (DE)

(72) Inventors: Bertram Bohringer, Erkrath (DE);
Raik Schonfeld, Erkrath (DE);
Alexander Dyachenko, Erkrath (DE);
Valeriy Larin, Erkrath (DE)

(73) Assignee: Blücher GmbH, Erkrath (DE)

( * ) Notice: Subject to any disclaimer, the term of this patent is extended or adjusted under 35 U.S.C. 154(b) by 267 days.

(21) Appl. No.: 14/891,856

(22) PCT Filed: Jun. 24, 2013

(86) PCT No.: PCT/EP2013/063125
§ 371 (c)(1),
(2) Date: Nov. 17, 2015

(87) PCT Pub. No.: WO2014/183807
PCT Pub. Date: Nov. 20, 2014

(65) Prior Publication Data
US 2016/0083817 A1    Mar. 24, 2016

(30) Foreign Application Priority Data

May 17, 2013    (EP) .................... PCT/EP2013/001474

(51) Int. Cl.
| C22B 61/00 | (2006.01) |
| C22B 1/04 | (2006.01) |
| C22B 11/06 | (2006.01) |
| C22B 1/02 | (2006.01) |
| C22B 3/14 | (2006.01) |

(Continued)

(52) U.S. Cl.
CPC ................ *C22B 61/00* (2013.01); *C22B 1/02* (2013.01); *C22B 1/04* (2013.01); *C22B 3/14* (2013.01); *C22B 3/20* (2013.01); *C22B 11/04* (2013.01); *C22B 11/06* (2013.01)

(58) Field of Classification Search
CPC .......... C22B 1/08; C22B 11/02; C22B 11/06; C22B 61/00; C01G 49/10; C01G 3/05; C01G 9/04; C01G 21/16; C01G 51/085; C01G 23/02–23/026; C01G 45/06; C01G 31/04; C01G 37/04; C01G 37/06
See application file for complete search history.

(56) References Cited

U.S. PATENT DOCUMENTS

| 1,943,339 | A | * | 1/1934 | Mitchell | .................. C22B 1/08 |
| | | | | | 423/109 |
| 2,045,092 | A | | 6/1936 | Mitchell | |

(Continued)

FOREIGN PATENT DOCUMENTS

| GB | 309307 | * | 4/1929 |
| GB | 1350392 | * | 4/1974 |

*Primary Examiner* — Steven J Bos
(74) *Attorney, Agent, or Firm* — Edward E. Sowers; Brannon Sowers & Cracraft PC

(57) ABSTRACT

The invention relates to a method and a recovery system for obtaining raw materials from ores and/or ore tailings, in particular a method and a recovery system for recovering metals from ores and/or ore tailings, especially a method and a recovery system for recovering metals from pyrite tailings, preferably from roasted pyrites produced during sulphuric acid manufacture.

14 Claims, 4 Drawing Sheets

(51) Int. Cl.
*C22B 3/20* (2006.01)
*C22B 3/00* (2006.01)

(56) References Cited

U.S. PATENT DOCUMENTS

| | | | | |
|---|---|---|---|---|
| 3,649,245 A * | 3/1972 | Colombo | ............... | C22B 1/08 423/138 |
| 3,652,219 A * | 3/1972 | Peters | ............... | C01G 49/10 423/140 |
| 3,674,462 A * | 7/1972 | Gorling | ............... | C22B 1/08 423/148 |
| 3,758,293 A * | 9/1973 | Viviani | ............... | C22B 1/08 423/148 |
| 3,896,211 A * | 7/1975 | Mayor | ............... | C01G 49/02 423/138 |
| 4,259,106 A * | 3/1981 | Aaltonen | ............... | C22B 5/14 423/153 |
| 4,353,740 A * | 10/1982 | Dunn | ............... | C22B 11/06 423/109 |
| 4,695,436 A * | 9/1987 | Wyndham | ............... | C01B 9/02 423/135 |
| 2007/0224109 A1 * | 9/2007 | Chaifetz | ............... | C01B 9/02 423/491 |

* cited by examiner

METHOD AND PLANT FOR PROCESSING ROASTED PYRITES

CROSS-REFERENCES TO RELATED APPLICATIONS

This application is a National Stage filing of International Application PCT/EP 2013/063125, filed Jun. 24, 2013, claiming priority to PCT/EP 2013/001474 filed May 17, 2013, entitled "Method and Plant for Processing Roasted Pyrites". The subject application claims priority to PCT/EP 2013/063125, and to PCT/EP 2013/001474 and incorporates all by reference herein, in their entirety.

BACKGROUND OF THE INVENTION

The present invention relates to the technical field of the extraction of metals, more particularly of iron, and/or of non-noble nonferrous metals and/or noble metals from ores and/or ore residues, preferably from pyrite residues or pyrite cinder, more particularly roasted pyrites.

The present invention relates more particularly to a method for obtaining raw material from ores and/or ore residues. Preferentially the present invention relates to a method for recovering metals from ores and/or ore residues, preferably to a method for recovering metals from pyrite residues, the pyrite residue comprising more particularly roasted pyrites obtained in the production of sulfuric acid.

Furthermore, the present invention relates to a corresponding recovery plant for obtaining raw material from ores and/or ore residues, more particularly for recovering metals from ores and/or ore residues, more particularly from pyrite residues or pyrite cinder, preferably from roasted pyrites obtained in the production of sulfuric acid, it being possible for the plant to be used to implement the method of the invention.

The present invention accordingly also relates to the use of the recovery plant of the invention in the method according to the invention for obtaining raw material from ores and/or ore residues.

In general, ores comprise, in particular, chemical compounds of metals, such as iron compounds, in the form of iron oxides, iron carbonates and iron sulfides, for example, it being possible for the metal compounds in question to be present in the ore as a mixture with nonferrous minerals.

The most important iron ores include magnetite, limonite, hematite and siderite. While iron in the case of magnetite is in the form of iron(II, III) oxide ($Fe_3O_4$), iron in hematite is encountered fundamentally as iron(II) oxide ($Fe_2O_3$). In siderite, furthermore, iron is primarily in the form of iron(II) carbonate ($FeCO_3$).

Known additionally, however, are natural ores in which iron is present primarily in conjunction with sulfur. These include, in particular, pyrite, which on account of its metallic luster and its brassy yellow coloring is also known synonymously as fool's gold.

In particular, pyrite includes a series of further technologically and/or economically significant metal components, such as zinc, copper, cobalt and lead, for example, and also further ingredients based on calcium and silicon, which in general, as a result of the primary industrial utilization of pyrite for the purpose of producing sulfuric acid, are not valorized and hence remain, so to speak, unutilized in the material or resulting roasted pyrites.

As mentioned above, iron in pyrite is present in particular in the form of the sulfide, more particularly as iron(II) disulfide or $FeS_2$; in this context, pyrite represents the most widespread sulfide mineral. On an industrial scale, it is used as starting material for producing or obtaining sulfuric acid, with the resulting residues being referred to as pyrite cinder or, synonymously, as purple ore or roasted pyrites.

In the course of the production of sulfuric acid using pyrite as starting material, the general procedure in the prior art is to subject pyrite, as sulfidic metal ore, to roasting in the presence of atmospheric oxygen, with iron sulfide present in pyrite giving rise first of all to sulfur dioxide ($SO_2$) and to iron oxides in different oxidation states. Subsequently, particularly as part of what is called a contact method or in a contact kiln, the resulting sulfur dioxide is oxidized using a catalyst, vanadium pentoxide, for example, and in the presence of additional oxygen, to form sulfur trioxide ($SO_2$). Subsequent adsorption and/or reaction with water then produces sulfuric acid ($H_2SO_4$).

In summary, therefore, the production of sulfuric acid starting from pyrite is carried out in particular in the form of a four-stage operation, the method comprising the following steps:

(i) roasting of pyrite, for example in a fluidized bed roasting furnace, for obtaining sulfur dioxide starting from iron sulfide or iron disulfide or iron(II) disulfide (with the corresponding chemical reaction equation $4FeS_2 + 11O_2 \rightarrow 2Fe_2O_3 + 8SO_2$);

(ii) subsequent gas purification, particularly for purifying sulfur dioxide obtained beforehand;

(iii) oxidation of sulfur dioxide to sulfur trioxide (with the corresponding chemical reaction equation $2SO_2 + O_2 \rightarrow 2SO_3$), a reaction which can be carried out with the use of catalyst in a contact reactor or tray reactor; and (iv) adsorption of sulfur trioxide with hydrous sulfuric acid, more particularly concentrated hydrous sulfuric acid, for the purpose of obtaining further sulfuric acid, with the sulfur trioxide acting as an anhydride of the resulting sulfuric acid (with the chemical reaction equation $SO_3 + H_2SO_4(H_2O) \rightarrow 2H_2SO_4$).

Generally speaking, on the industrial scale, sulfuric acid is employed in very large quantities and in numerous sectors of the chemical industry: a large proportion of the sulfuric acid produced goes into the production of fertilizers. Furthermore, sulfuric acid acts as a starting product or intermediate in the production of other industrially relevant products, such as catalysts, surfactants, acids, such as hydrofluoric acid, sulfates, drying agents, reaction auxiliaries, and the like. Not least on account of the numerous possible uses of sulfuric acid, it is clear that there is a high demand for it: accordingly, worldwide production of sulfuric acid has exceeded the order of magnitude of 200 million metric tonnes per annum, making sulfuric acid globally the most produced chemical.

Against this background as well it is clear that in the production of sulfuric acid using pyrite as starting material, large quantities of pyrite cinder or roasted pyrites result. These, generally speaking, are the waste or residue arising in the form of pyrite from the roasting of the starting materials and starting ores employed. Roasted pyrites, in particular, comprise a solid residue arising in the production of sulfur dioxide or sulfuric acid by thermal treatment of pyrite. The general assumption is that on a worldwide basis, at least 20 million metric tonnes of roasted pyrites are obtained annually in connection with the production of sulfuric acid.

The roasted pyrites are generally stored or land filled at the site of production, there already being very large stocks of roasted pyrites present on a worldwide basis in connection with the production of sulfuric acid, which has been practiced from the end of the 19th Century onward. Since the pyrite forming the basis for the production of sulfuric acid, before being processed, is generally comminuted or ground, the resulting roasted pyrites take the form, generally, of a finely particulate and, in particular, relatively homogeneous substance.

As far as the resulting pyrite cinder or roasted pyrites, generally, are concerned, they comprise large amounts of iron and also economically relevant amounts of further metals, including noble metals as well, which are not removed from the starting material in the course of sulfuric acid production, meaning that roasted pyrites as such, against this background, are a valuable raw material for the recovery of economically relevant quantities of metals, including noble metals.

In particular, roasted pyrites comprise iron oxides in the form of FeO, $Fe_2O_3$ (hematite) and/or $Fe_3O_4$ (magnetite), and residual amounts of $FeS_2$ (iron disulfide), which are responsible in particular for the reddish coloration of roasted pyrites. As well as silicon dioxide ($SiO_2$) and sulfates, particularly in the form of calcium sulfate ($CaSO_4$), roasted pyrites also include significant quantities of the metals zinc, copper, cobalt, titanium, manganese, vanadium, chromium and lead. Furthermore, roasted pyrites also comprise noble metals, more particularly in the form of gold and/or silver. In this regard as well, roasted pyrites harbor a not least economically high potential in relation to the extraction or recovery of metals, non-noble nonferrous metals, and noble metals.

Against this background, initial approaches in the prior art have been pursued into making economic use of the roasted pyrites resulting as a waste product of sulfuric acid production, with a relevant focus having been directed not least on the recovery of iron starting from roasted pyrites.

Thus, for example, the residue in the form of pyrite cinder or roasted pyrites that remains in the getting of sulfuric acid is used in blast furnaces. The focus in this regard, however, is exclusively on the obtention of iron, meaning that complete utilization of the raw materials present in the residue is not realized.

Furthermore, U.S. Pat. No. 4,259,106 A relates to a method for the roasting of an iron-containing starting material, such as roasted pyrites, which also comprises further metals, the intention being to subject the further metals to a chlorination. With regard to the chlorinating reagent, calcium chloride is the authoritative reference point. In this context, chlorination only of non-iron metals is envisaged, the intention being that iron as such should remain in the melt. A disadvantage, moreover, is the high energy consumption associated with the underlying method.

Moreover, GB 1 236 345 A is not aimed at recovery of iron specifically. In particular, the intention is only that there should be chlorination of non-iron metals at the same time as the roasting of the starting material. On the basis of the chlorinating agents used and the process regime selected, moreover, there is a high resulting corrosion activity, which is detrimental particularly to the apparatus on which the method is based.

Furthermore, EP 0 538 168 A1 is not directed to the chlorination and recovery of iron from roasted pyrites. Instead, this document is aimed at optimizing the cyanide leaching indicated for the recovery of gold and silver, there being no intention to recover metallic iron. The process regime selected, moreover, is economically disadvantageous.

Furthermore, CN 101 067 163 A describes a treatment method for pyrite where neither roasting nor chlorination is envisaged. For this reason as well, the isolation of individual components from the raw material is not very efficient.

Furthermore, CN 102 605 172 A relates to a method involving pyrite roasting, which envisages subsequent reduction of the cinder using a biomass. As a result of the carbon present in the biomass, the aim is to reduce iron(III) oxide to metallic iron. The resulting metallic iron is to be isolated via magnetic separation. Extensive recovery of further metals is not envisaged.

Moreover, CN 102 502 527 A is geared to the use of iron sulfate as a starting substance, which with pyrite and elemental sulfur is to be reacted to give iron powder. Chlorination within the recovery process is not envisaged. Selective separation of different metal components is not effectively ensured.

CN 102 251 067 A is aimed at a treatment of pyrite or pyrite cinder without chlorination, the intention being to remove metallic constituents by means of leaching methods. Disadvantages here, however, are the high level of chemical usage and also the occasionally low selectivity of the separation procedure.

CN 102 225 374 A relates to magnetic separation of iron following removal of other metals from pyrite cinder. Chlorination of metallic components is not envisaged. Nor is targeted and selected separation of different metal components envisaged.

Furthermore, CN 102 121 059 A relates to a roasting method for pyrite. Chlorination of metallic components is not described. Furthermore, iron is reduced using carbon. A disadvantage in this case, however, is that occasionally the resulting metallic iron is not of high purity, since impurities may result from the carbon used for the reduction.

CN 102 344 124 A describes the conversion of iron sulfate via the monohydrate form into sulfuric acid, iron and iron oxide, with pyrite being used as starting material. There is no description of specific chlorination. Similarly, extensive separation and recovery of different metals is not envisaged.

Moreover, GB 1 350 392 A relates to the obtention of non-noble nonferrous metals from pyrite after roasting and chlorination of the non-noble nonferrous metals. Chlorination of iron is not envisaged. The iron component is to remain in the form of iron oxide in the residue. Accordingly, efficient separation of all the components is not possible.

U.S. Pat. No. 4,576,812 A relates to a method whereby iron chloride is used as a chloride source: starting from iron chloride and employing oxygen, the aim subsequently is to produce iron(III) oxide, which is then used for the recovery of iron. Roasting of the starting material is not described, and so occasionally dispersant starting materials are present.

Furthermore, DE 2 005 951 A is directed to a method for processing pyrite cinder to form feedstocks for blast furnaces. The pyrite cinder in this case is to be pelletized and burnt in a rotary furnace in the presence of calcium chloride, the purpose of the calcium chloride being to oxidize the iron. No further processing or separation is envisaged, and/or is impossible on account of the specific process regime.

DE 637 443 A relates to the reduction of iron chloride using steam and optionally coal, starting from materials containing ferrous sulfide, the aim being to obtain elemental sulfur.

The scientific publication Trumbull R. C. et al., "*Transactions of the Institution of Mining and Metallurgy*", 58, 1949, pages 1 to 31, relates to a method for the treatment of pyrite cinder according to the so-called Henderson process. In accordance with this method, the pyrite cinder is first of all comminuted and then subjected to roasting in the presence of sodium chloride. From the residue obtained in this way, non-noble nonferrous metals are removed. There is, however, no intention of recovering iron from the pyrite cinder treated in this way. The roasting takes place in the presence of sodium chloride at temperatures of above 350° C. and in the presence of oxygen.

The scientific publication Pitsch H. et al., *Revista de Metalurgia*, 6, 1970, pages 490 to 500, relates to a method for removing non-noble nonferrous metals from pyrite cinder using chlorinating reagents in the form of chlorine gas or calcium chloride. There is no intention to recover iron from the treated pyrite cinder. The pyrite cinder is chlorinated in an oxidizing atmosphere at high temperatures at 1000 to 1200° C., with the consequence that any resultant iron(III) chloride is immediately converted to iron(III) oxide and, consequently, there is no iron(III) chloride present after the chlorination.

The processing methods known in the prior art for metallic ores, especially pyrite, or for waste products arising in the processing of these ores, such as roasted pyrites, are therefore often associated with the drawback that on the one hand the underlying methods are technically complex and are carried out using a high volume of chemicals, and secondly that comprehensive separation and/or recovery of different metal components is not possible. Equally, some of the plant used for the methods in question, owing to the complex process regime, is costly and inconvenient.

BRIEF SUMMARY OF THE INVENTION

Against this technical background, therefore, the object addressed by the present invention is that of providing an efficient method and a corresponding plant and device for obtaining or recovering raw material from ores and/or ore residues, and/or for recovering metals, or noble metals, and also, optionally, further components, in particular from roasted pyrites arising in the production of sulfuric acid, where the disadvantages outlined above, affecting the prior art, are to be at least largely avoided or else at least attenuated.

An object of the present invention is seen in particular as being that of providing an efficient method and relevant plant and/or devices, the aim being in particular to permit extremely comprehensive and selective recovery of metals, including noble metals, from the parent roasted pyrites. In particular, the intention is to isolate or recover a large number of different metals, and also noble metals, from the parent roasted pyrite, selectively and with high purity.

Furthermore, a further object of the present invention lies in the provision of a highly efficient method, minimizing the usage of chemicals and/or of energy, for the recovery of metals, or noble metals, from a parent roasted pyrite, more particularly roasted pyrites, particularly involving recycling or re-utilization of the process chemicals used as part of the recovery procedure.

Moreover, according to a further objective of the present invention, the aim is to provide corresponding plant or devices which allow an efficient regime for the recovery of the components in question from a roasting product, more particularly roasted pyrites, where the plants and devices in question are at the same time also to be optimized from an economic and environmental standpoint, equally in particular with regard to the parent method.

The objective outlined above is achieved in accordance with the invention by the subject matter disclosed herein, which concerns the method of the invention for obtaining raw materials from ores and/or ore residues, more particularly the method according to the invention for recovering metals from ores and/or ore residues, preferably from pyrite residues, more preferably from roasted pyrites obtained in the production of sulfuric acid; further advantageous embodiments and developments of this aspect of the invention are similarly disclosed.

Further provided by the present invention is the recovery plant of the invention, preferably for obtaining raw material from ores and/or ore residues, preferably for the recovery of metals from ores and/or ore residues, more preferably for the recovery of metals from pyrite residues, very preferably from roasted pyrites obtained in the production of sulfuric acid, as defined in the corresponding discussion relating to the plant; further, advantageous embodiments and developments of the plant of the invention are also discussed.

Moreover, the present invention provides for the use of the recovery plant according to the invention in the method of the invention for obtaining raw material from ores and/or ore residues.

It will be appreciated that configurations, embodiments, advantages and the like which are cited below in relation only to one aspect of the invention, in order to avoid repetition, are of course equally valid in relation to the other aspects of the invention.

It will further be appreciated that in the context of values, numbers and ranges specified below, the specified ranges should not be interpreted as imposing any restriction; it is self-evident that, by virtue of the specific case or specific application, deviations may be made from the stated ranges and figures, without departing the scope of the present invention.

It is the case, moreover, that all value and parameter indications given hereinafter, or the like, can fundamentally be ascertained or determined using standardized or explicitly stated determination methods or else with determination methods that are familiar per se to the skilled person.

For all of the relative or percentage, especially weight-based, quantity figures stated hereinafter, moreover, it should be borne in mind that in the context of the present invention, these figures should be selected and/or combined in such a way that the total—possibly including further components or ingredients or constituents, especially as defined hereinafter—always results as 100% or 100 wt %. This, however, is self-evident to the skilled person.

On this basis, the present invention is described in more detail below.

DETAILED DESCRIPTION OF THE INVENTION

Figure 1:
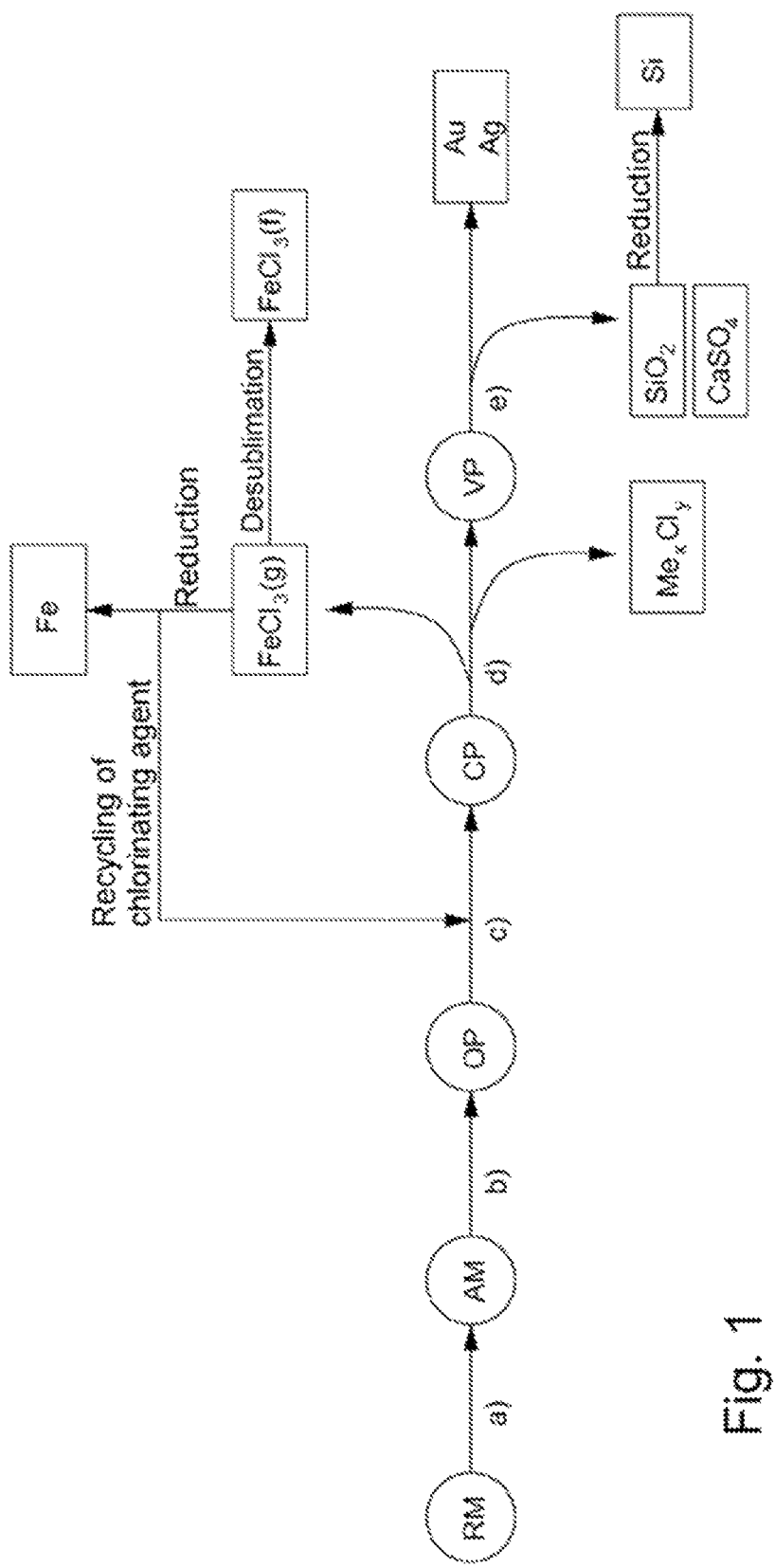
FIG. 1 shows a schematic representation or overview of the method of the invention for obtaining raw material from ores or ore residues, more particularly for recovering metals from ores or ore residues, preferably for recovering metals from pyrite residues, more preferably from roasted pyrites obtained in the production of sulfuric acid.

A subject of the present invention, therefore—according to a first aspect of the present invention—is a method for obtaining raw material from ores and/or ore residues, more particularly a method for recovering metals from ores and/or ore residuals, preferably from pyrite residues, more preferably from roasted pyrites obtained in the production of sulfuric acid, where the method comprises the following method steps:

(a) providing, more particularly processing, of a starting material in the form of at least one ore and/or ore residue, more particularly of at least one pyrite residue, preferably of one or more roasted pyrites obtained in the production of sulfuric acid, where the starting material comprises
  i) iron, preferably as main constituent, and
  ii) at least one noble metal, more particularly gold and/or silver, and also
  iii) at least one further metal, preferably selected from the group of copper, zinc, lead, cobalt, titanium, manganese, vanadium and chromium, more preferably selected from the group of copper, zinc, lead and cobalt;

(b) oxidation treatment, more particularly calcining and/or oxidative roasting, of the starting material provided in method step (a), preferably using at least one oxidizing agent, more particularly air and/or oxygen, more particularly to give iron-oxide and optionally oxides of the further metals;

(c) chlorination of the oxidation products, more particularly oxides, obtained in method step (b), preferably using at least one chlorinating agent, more particularly recyclable chlorinating agent, preferably chlorination of iron oxide and optionally of the oxides of the further metals, more particularly to give iron chloride and optionally chlorides of the further metals;

(d) removing of the chlorinated products obtained in method step (c), more particularly of iron chloride and optionally chlorides of the further metals, from the product mixture obtained in method step (c);

(e) optionally removing of the noble metal, more particularly of gold and/or silver, from the product mixture obtained in method step (d);

where the above-stated method steps (a) to (e) are carried out in the order listed above.

The method of the invention therefore relates to the targeted or selective obtaining of raw material more particularly from pyrite residues and, preferably, from roasted pyrites obtained in the production of sulfuric acid. The roasted pyrites therefore comprise in particular roasted pyrites which originate from the production of sulfuric acid and which are obtained, in particular, as waste or residue as part of sulfuric acid production. This method of the invention is associated with the central advantage that a large number of raw materials, on the basis of metals and/or metal compounds, can be obtained or isolated from the underlying starting material—which is present as waste material in large quantities; in this context, the method of the invention equally permits a high selectivity in relation to the metal components to be obtained from the starting material. In particular, the method of the invention also permits effective recovery or purification of noble metals, such as gold or silver, that are present in the starting material.

By virtue of the specific procedure according to the present invention, moreover, at least substantially complete digestion of the starting material is possible, with the possibility being provided equally of the provision of high-purity end products from the starting material, thereby ensuring overall, in relation to the purified metal components, high qualities and purities as well.

A particular focus of the method according to the invention lies in particular on the targeted isolation of iron, which both, in particular, in the form of iron chloride as an important commercial and industrial product, and in the form of metallic iron as a significant raw material, especially for the metal industry, can be provided. The removing of the iron component, which generally represents a main constituent or a main component of the pyrite cinder or roast pyrites employed in accordance with the invention, takes place in particular, in the sequence of the method to logical procedure, before the removing or recovery of the other components. Accordingly, the main component is removed at a very early stage, with the consequence that the relative proportions of the other metal-based components, or of the noble metal components, in the product mixture freed of iron are increased accordingly, thereby providing optimization, in turn, of the downstream or subsequent recovery of these raw materials, especially with regard to reduced deployment of chemicals and/or energy for the purpose of removing the further, non-iron metal components and/or the noble metals. This approach in accordance with the invention raises the efficiency of the recovery of the further metal components and/or noble metals.

A further central idea in the present invention can be seen, moreover, in the fact that the chlorinating agent used for the chlorination of the metal components, which according to one inventively particularly preferred embodiment, as outlined below, is ammonium chloride ($NH_4Cl$), can be recycled or regenerated. It should also be emphasized in this context that the starting materials or components used for the recycling are equally obtained themselves as part of the method of the invention or processing sequence, and so in this way there is a further optimization, particularly since there is no need for the additional use of chemicals for the recycling.

With regard to "recycling" as it is used in the context of the present invention in relation to the chlorinating agent, this term should be understood very broadly. In particular, the term "recycling" pertains to renewed obtention of chlorinating agent used beforehand for the chlorination of the metal components as part of the method of the invention, and exhausted or degraded. The recycling in this case takes place in particular on the basis of chemical reactions, whereby in particular, degradation products originating from the chlorinating agent in the chlorinating process are isolated and used as starting material in subsequent chemical reactions with a corresponding co-reactant for the renewed obtention of the chlorinating agent as a recyclate. As set out in detail below, the chlorinating agent used in accordance with the invention is, in particular, ammonium chloride ($NH_4Cl$), and the degradation product obtained as part of the chlorination procedure, namely ammonia ($NH_3$), is reacted preferentially with an inorganic chlorine compound, more particularly hydrogen chloride, thereby producing the recyclate, namely ammonium chloride, which can in turn be used again as a chlorinating agent.

A further advantage of the method of the invention is to be seen in the fact that the starting substances needed for the recycling, particularly as part of the method of the invention, are themselves generated or obtained, meaning that in relation to the chlorinating agent it is possible, so to speak, for a closed circuit to result, especially as regards the chlorine constituent, hand in hand with an increased efficiency of the method of the invention, with simultaneously reduced costs and improved environmental balance. In the context of the present invention, however, it is equally possible for the starting materials for the recycling of the chlorinating agent, especially with regard to the inorganic chlorine compound, to be added externally. Against this background as well, the method of the invention features high flexibility, and so the method of the invention, so to speak, can be individually adapted or tailored to some extent against the background of the specific process carried out, as defined below, including in relation to the recycling of the chlorinating agent.

The procedure according to the invention results in a method which is optimized just as much economically as it is environmentally, with reduced production of waste materials and waste gases, the required deployment of energy for the implementation of the method being reduced at the same time.

In summary, therefore, the present invention for the first time provides a method for the targeted or selective processing particularly of pyrite residues, such as roasted pyrites, that allows an efficient and comprehensive utilization of the waste material—in particular, roasted pyrites originating from sulfuric acid production. It is also important in this regard that the pyrite residues or roasted pyrites in question are available in large quantities for use as a result of the decades-long production of sulfuric acid, meaning that in accordance with the invention it is possible to have recourse to resources that are of corresponding extensiveness. In this context, a further advantage of the approach according to the invention is that from environmentally specific aspects as well, occasionally not unproblematic stockpiles of the aforesaid pyrite residues or roasted pyrites can be consumed or reduced.

As mentioned above, the starting material used in the method of the invention contains a multiplicity of metals and metal components, with iron generally constituting a main constituent. With regard to the parent iron and also the other metallic components, such as copper, zinc, lead, cobalt, titanium, manganese, vanadium and chromium, they are present in particular not in metallic form as such, in the starting material used for the method of the invention, but instead in the form of corresponding metal-containing compounds, more particularly in the form of oxides, and in this respect as well the respective metals may be present in different oxidation states. Accordingly, for iron, in relation to the starting material, the case is typically that iron may be present, for example, as iron(II) oxide, iron(II, III) oxide and/or iron(III) oxide, particularly as indicated further below. Furthermore, for the noble metals present in the starting material, preferably in relation to gold, it is the case that the respective noble metals, preferably gold, are present in metallic form in the starting material. With regard to the silver present in the starting material, it may generally be present in the starting material in the form of a compound, more particularly as oxide, but also in metallic form.

As far as the starting material is concerned that is used in the method of the invention, particularly in the form of pyrite residues or roasted pyrites, the starting material may comprise iron in the form of at least one iron oxide. In this context provision may be made in particular for the starting material to comprise iron oxide in the form of iron(II) oxide (FeO), iron(III) oxide ($Fe_2O_3$) and/or iron(II, III) oxide ($Fe_3O_4$).

In this context the starting material may comprise iron, more particularly in the form of iron oxide, in amounts in the range from 10 wt % to 75 wt %, more particularly in the range from 20 wt % to 70 wt %, preferably in the range from 30 wt % to 65 wt %, more preferably in the range from 40 wt % to 60 wt %, calculated as element and based on the dry weight of the starting material. As noted above, therefore, iron constitutes the main component of the starting material to be processed, and so against this background as well, high recovery quantities or yields in respect of iron are made possible in the context of the method of the invention.

Furthermore, the starting material may comprise the noble metal, more particularly gold and/or silver, in amounts in the range from 0.1 g/t to 300 g/t, more particularly in the range from 0.5 g/t to 200 g/t, preferably in the range from 0.75 g/t to 100 g/t, more preferably in the range from 1 g/t to 50 g/t, calculated as element and based on the dry weight of the starting material. The above figures are based on the sum of the stated metals in the starting material.

The starting material may more particularly comprise gold in the form of metallic gold. Another reason in particular why gold is in metallic form is that on account of the noble physical properties of the element, it is not amenable to combustion in the presence of oxygen.

More particularly, in this context, the starting material may comprise gold in amounts in the range from 0.1 g/t to 15 g/t, more particularly in the range from 0.2 g/t to 10 g/t, preferably in the range from 0.5 g/t to 8 g/t, more preferably in the range from 1 g/t to 5 g/t, calculated as element and based on the dry weight of the starting material.

The starting material may further comprise silver in the form of metallic silver and/or in the form of silver oxide, especially silver(I) oxide. As a noble metal, silver is generally relatively tardy in reactivity, but is less noble than gold, meaning that silver may as indicated above be present in the starting material at least partly in the form of silver oxide, as well.

As far as the noble metal silver in the starting material is concerned, moreover, the starting material may comprise silver in amounts in the range from 1 g/t to 300 g/t, more particularly in the range from 2 g/t to 200 g/t, preferably in the range from 3 g/t to 100 g/t, more preferably in the range from 5 g/t to 50 g/t, calculated as element and based on the dry weight of the starting material.

In view of the presence of noble metals, more particularly gold and/or silver, in relevant amounts, the starting material is also economically significant in relation to the recovery of these noble metals. In particular, on the basis of the method of the invention, in addition to the obtention of iron and other products of economic interest, an efficient and cost-effective method is also provided for the recovery of noble metals, such as gold and/or silver, from the parent starting material, leading to a significant increase in the economics of the method of the invention, since the noble metal components generally have a high material value.

Furthermore, the starting material may comprise the further metal, more particularly copper, zinc, lead, cobalt, titanium, manganese, vanadium and/or chromium, preferably copper, zinc, lead and/or cobalt, in amounts in the range from 0.001 wt % to 10 wt %, more particularly in the range from 0.005 wt % to 5 wt %, preferably in the range from 0.0075 wt % to 3 wt %, more preferably in the range from 0.01 wt % to 2 wt %, calculated as element and based on the dry weight of the starting material. The above figures are based on the sum of the stated metals in the starting material.

With regard to the further metal in the form of copper in this context, the starting material may comprise copper in the form of copper oxide, more particularly copper(I) oxide and/or copper(II) oxide.

In this context the starting material may comprise copper, more particularly in the form of copper oxide, in amounts in the range from 0.01 wt % to 5 wt %, more particularly in the range from 0.05 wt % to 3 wt %, preferably in the range from 0.075 wt % to 2 wt %, more preferably in the range from 0.1 wt % to 1 wt %, calculated as element and based on the dry weight of the starting material.

With regard, moreover, to the further metal in the form of zinc, the starting material may comprise zinc in the form of zinc oxide, more particularly zinc(II) oxide.

In this context, the starting material may comprise zinc, more particularly in the form of a zinc oxide, in amounts in the range from 0.02 wt % to 10 wt %, more particularly in the range from 0.075 wt % to 5 wt %, preferably in the range from 0.1 wt % to 3 wt %, more preferably in the range from 0.2 wt % to 2 wt %, calculated as element and based on the dry weight of the starting material.

With regard, moreover, to the further metal in the form of lead, the starting material may comprise lead in the form of lead oxide, more particularly lead(II) oxide.

In this context, the starting material may comprise lead, more particularly in the form of a lead oxide, in amounts in the range from 0.1 wt % to 5 wt %, more particularly in the range from 0.05 wt % to 4 wt %, preferably in the range from 0.1 wt % to 2 wt %, more preferably in the range from 0.15 wt % to 1.5 wt %, calculated as element and based on the dry weight of the starting material.

With regard, moreover, to the further metal in the form of cobalt, the starting material may comprise cobalt in the form of cobalt oxide, more particularly cobalt(II) oxide.

In this context, the starting material may comprise cobalt, more particularly in the form of a cobalt oxide, in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %, calculated as element and based on the dry weight of the starting material.

With regard, moreover, to the further metal in the form of titanium, the starting material may comprise titanium in the form of titanium oxide.

In this context, the starting material may comprise titanium, more particularly in the form of a titanium oxide, in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %, calculated as element and based on the dry weight of the starting material.

With regard, moreover, to the further metal in the form of manganese, the starting material may comprise manganese in the form of manganese oxide.

In this context, the starting material may comprise manganese, more particularly in the form of a manganese oxide, in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %, calculated as element and based on the dry weight of the starting material.

With regard, furthermore, to the further metal in the form of vanadium, the starting material may comprise vanadium in the form of vanadium oxide.

In this context, the starting material may comprise vanadium, more particularly in the form of a vanadium oxide, in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %, calculated as element and based on the dry weight of the starting material.

With regard, furthermore, to the further metal in the form of chromium, the starting material may comprise chromium in the form of chromium oxide.

In this context, the starting material may comprise chromium, more particularly in the form of a chromium oxide, in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %, calculated as element and based on the dry weight of the starting material.

Furthermore, the starting material may comprise at least one semimetal. In particular the semimetal may be selected from the group of silicon, arsenic, selenium, antimony, tellurium and combinations thereof, more particularly silicon. The starting material may comprise the semimetal, more particularly silicon, arsenic, selenium, antimony and/or tellurium, in amounts in the range from 1 wt % to 40 wt %, more particularly in the range from 2 wt % to 30 wt %, preferably in the range from 3 wt % to 20 wt %, more preferably in the range from 4 wt % to 15 wt %, calculated as elements and based on the dry weight of the starting material. The above figures are based on the sum of semimetals in the starting material.

Furthermore, the starting material may comprise at least one transition metal, more particularly manganese and/or molybdenum.

In particular, the starting material may comprise silicon, more particularly in the form of silicon oxide, preferably silicon dioxide ($SiO_2$).

More particularly the starting material may comprise silicon, more particularly in the form of silicon oxide, in amounts in the range from 0.5 wt % to 30 wt %, more particularly in the range from 1 wt % to 20 wt %, preferably in the range from 2 wt % to 15 wt %, more preferably in the range from 3 wt % to 10 wt %, calculated as element and based on the dry weight of the starting material.

Furthermore, the starting material may comprise arsenic, more particularly in amounts of not more than 1 wt %, more particularly not more than 0.5 wt %, preferably not more than 0.3 wt %, calculated as element and based on the dry weight of the starting material.

The starting material may further comprise at least one alkali metal and/or alkaline earth metal, more particularly at least one alkaline earth metal, preferably calcium.

In particular, the alkali metal and/or alkaline earth metal, more particularly the alkaline earth metal, preferably calcium, may be present in the form of at least one salt, more particularly sulfate. The starting material may more particularly comprise calcium sulfate.

In this context, the starting material may comprise the alkali metal and/or alkaline earth metal, more particularly the alkaline earth metal, preferably calcium, more preferably in the form of calcium sulfate, in amounts in the range from 0.2 wt % to 20 wt %, more particularly in the range from 0.5 wt % to 15 wt %, preferably in the range from 1 wt % to 10 wt %, more preferably in the range from 2 wt % to 8 wt %, calculated as element and based on the dry weight of the starting material.

Furthermore, the starting material may comprise at least one nonmetal, more particularly selected from the group of carbon, nitrogen, sulfur and phosphorus, more particularly sulfur, preferably in the form of the respective salts.

In this context the starting material may comprise sulfur, more particularly in the form of sulfur-containing salts, preferably sulfides, such as iron disulfide, and/or, more preferably, sulfates.

In this context, the starting material may comprise sulfur in amounts in the range from 0.2 wt % to 15 wt %, more particularly in the range from 0.5 wt % to 10 wt %, preferably in the range from 1 wt % to 8 wt %, more preferably in the range from 1.5 wt % to 6 wt %, calculated as element and based on the dry weight of the starting material.

In accordance with the invention it may in particular be the case that the starting material, more particularly the pyrite residue or roasted pyrites, comprises the following ingredients, calculated in each case as element and based in each case on the dry weight of the starting material:

- iron, more particularly in the form of iron oxide, for example in amounts in the range from 10 wt % to 75 wt %, more particularly in the range from 20 wt % to 70 wt %, preferably in the range from 30 wt % to 65 wt %, more preferably in the range from 40 wt % to 60 wt %;
- gold, more particularly in amounts in the range from 0.1 g/t to 15 g/t, more particularly in the range from 0.2 g/t to 10 g/t, preferably in the range from 0.5 g/t to 8 g/t, more preferably in the range from 1 g/t to 5 g/t;
- silver, more particularly in amounts in the range from 1 g/t to 300 g/t, more particularly in the range from 2 g/t to 200 g/t, preferably in the range from 3 g/t to 100 g/t, more preferably in the range from 5 g/t to 50 g/t;
- copper, more particularly in the form of copper oxide, for example in amounts in the range from 0.01 wt % to 5 wt %, more particularly in the range from 0.05 wt % to 3 wt %, preferably in the range from 0.075 wt % to 2 wt %, more preferably in the range from 0.1 wt % to 1 wt %;
- zinc, more particularly in the form of zinc oxide, for example in amounts in the range from 0.02 wt % to 10 wt %, more particularly in the range from 0.075 wt % to 5 wt %, preferably in the range from 0.1 wt % to 3 wt %, more preferably in the range from 0.2 wt % to 2 wt %;
- lead, more particularly in the form of lead oxide, for example in amounts in the range from 0.01 wt % to 5 wt %, more particularly in the range from 0.05 wt % to 4 wt %, preferably in the range from 0.1 wt % to 2 wt %, more preferably in the range from 0.15 wt % to 1.5 wt %;
- cobalt, more particularly in the form of cobalt oxide, for example in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %;
- titanium, more particularly in the form of titanium oxide, for example in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %;
- manganese, more particularly in the form of manganese oxide, for example in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %;
- vanadium, more particularly in the form of vanadium oxide, for example in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %;
- chromium, more particularly in the form of chromium oxide, for example in amounts in the range from 0.001 wt % to 2 wt %, more particularly in the range from 0.005 wt % to 1 wt %, preferably in the range from 0.0075 wt % to 0.5 wt %, more preferably in the range from 0.01 wt % to 0.1 wt %;
- silicon, more particularly in the form of silicon dioxide, for example in amounts in the range from 0.5 wt % to 30 wt %, more particularly in the range from 1 wt % to 20 wt %, preferably in the range from 2 wt % to 15 wt %, more preferably in the range from 3 wt % to 10 wt %;
- arsenic, for example in amounts of not more than 1 wt %, more particularly not more than 0.5 wt %, preferably not more than 0.3 wt %;
- calcium, more particularly in the form of calcium sulfate, for example in amounts in the range from 0.2 wt % to 20 wt %, more particularly in the range from 0.5 wt % to 15 wt %, preferably in the range from 1 wt % to 10 wt %; and/or
- sulfur, more particularly in the form of sulfur-containing salts for example in amounts in the range from 0.2 wt % to 15 wt %, more particularly in the range from 0.5 wt % to 10 wt %, preferably in the range from 1 wt % to 8 wt %, more preferably in the range from 1.5 wt % to 6 wt %.

The starting material here may comprise the following ingredients, based in each case on the dry weight of the starting material:

- iron(II, III) oxide ($Fe_3O_4$), more particularly in amounts in the range from 10 wt % to 80 wt %, more particularly in the range from 20 wt % to 70 wt %, preferably in the range from 30 wt % to 60 wt %;
- iron(III) oxide ($Fe_2O_3$), more particularly in amounts in the range from 5 wt % to 50 wt %, more particularly in the range from 10 wt % to 40 wt %, preferably in the range from 15 wt % to 30 wt %;
- silicon dioxide, more particularly in amounts in the range from 2 wt % to 30 wt %, more particularly in the range from 5 wt % to 25 wt %, preferably in the range from 10 wt % to 20 wt %; and/or
- calcium sulfate, more particularly in amounts in the range from 1 wt % to 25 wt %, more particularly in the range from 2 wt % to 20 wt %, preferably in the range from 5 wt % to 15 wt %.

The underlying starting material, more particularly in the form of pyrite residues or roasted pyrites, as obtained in particular in the production of sulfuric acid, therefore contains—alongside iron, more particularly in the form of iron oxides, as main constituent—numerous further metals or noble metals, meaning that the starting material used in accordance with the invention is outstandingly suitable for use in the context of the present invention, since a multiplicity of different components with industrial and economic relevance, based on metals or noble metals, are recovered or obtained from the starting material, with the method of the invention in this respect enabling selective and comprehensive recovery of the components in question, including in particular in the form of the respective metals.

With regard to the method of the invention as such, provision may be made in accordance with the invention for comminution and/or homogenization of the starting material to be carried out in method step (a), or before implementation of method step (b). In particular the starting material may be adjusted to average particle sizes, more particularly average particle size $D_{50}$, in the range from 0.1 µm to 10 cm, more particularly 1 µm to 5 cm, preferably 100 µm to 1 cm, more preferably 500 µm to 0.5 cm. For this purpose it is possible to use customary comminuting apparatus well known per se to the skilled person, such as crushing and/or grinding apparatus. The particle size determination may also be carried out with methods well-known per se to the skilled person, based for example on light microscopy, x-ray diffraction, light scattering, such as laser diffractometry. The comminution optionally provided as part of the method of the invention, particularly for obtaining uniform particle sizes in the parent starting material, results in better handling and also improved recovery of the respective metal constituents, in particular on the basis of enhanced digestion of the material and the like.

Furthermore, provision may be made as part of the present invention for drying of the starting material to be carried out in method step (a) and/or before implementation of method step (b). In this context, the starting material may be heated to temperatures in the range from 50° C. to 180° C., more particularly 80° C. to 160° C., preferably 100° C. to 140° C. It is of advantage in accordance with the invention if the starting material is adjusted to a residual moisture content of not more than 5 wt %, more particularly not more than 3 wt %, preferably not more than 2 wt %, more preferably not more than 1 wt %, based on the dried starting material. The adjustment of the starting material to a defined residual moisture content, as defined above, leads in particular to a further-improved method regime both in terms of the handling of the starting material and in relation to the chemical reaction processes underlying the method of the invention.

With further regard to the method of the invention, it is of advantage in accordance with the invention if in method step (b) the oxidation treatment is carried out as solid phase reaction. The oxidation treatment ought in particular to be carried out with heating of the starting material. More particularly the oxidation treatment may be carried out at temperatures in the range from 500° C. to 1000° C., more particularly in the range from 600° C. to 900° C., preferably in the range from 650° C. to 950° C. In a manner preferred in accordance with the invention, the oxidation treatment ought to be carried out using and/or in the presence of a preferably gaseous oxidizing agent, more particularly air and/or oxygen.

In this context, the oxidation treatment may be carried out in general in the devices suitable for this purpose that are known fundamentally to the skilled person. More particularly the oxidation treatment may be carried out in an oxidation and/or roasting device. In this context, for example, the oxidation and/or roasting device may be selected from the group of rotary kilns, drum kilns, fluidized bed kilns and entrained flow reactors.

In particular, in accordance with the invention, it is provided that, in the oxidation treatment in method step (b), iron is converted at least substantially completely into the trivalent form, more particularly into iron(III), preferably into iron(III) oxide. In particular, in the oxidation treatment in method step (b), therefore, iron(III) is obtained. Moreover, provision may be made in method step (b), in the oxidation treatment, for iron(II, III) oxide and/or iron(II) oxide to be converted into iron(III) oxide.

In the oxidation treatment in method step (b), therefore, an at least substantially complete reaction of the various oxidation states and/or oxides of iron in the starting material to give iron(III) oxide is ensured. In particular, the reaction of the respective iron oxides to give iron(III) oxide may take place in accordance with the following reaction equation (i) and/or (ii):

$$2Fe_3O_4 + O_2 \rightarrow 3Fe_2O_3 \text{ and/or} \qquad (i)$$

$$4FeO + 3O_2 \rightarrow 2Fe_2O_3 \qquad (ii)$$

The reaction of iron to give iron(III) oxide is carried out in particular against the background that in accordance with the invention there is a downstream or subsequent chlorination provided in order to obtain iron(III) chloride ($FeCl_3$), which with respect to the regime of the invention possesses optimum sublimation properties and hence removing properties, as observed further below.

In the oxidation treatment in method step (b), there may also be provision for the further metals as well, especially as defined above, preferably copper, zinc, lead, cobalt, titanium, manganese, vanadium and/or chromium, more preferably copper, zinc, lead and/or cobalt, and optionally the noble metal in the form of silver, to be converted into in each case uniform oxidation states.

In this context, the product mixture obtained in or after the oxidation treatment in method step (b) may comprise iron (III) oxide in amounts in the range from 10 wt % to 95 wt %, more particularly in the range from 20 wt % to 90 wt %, preferably in the range from 40 wt % to 85 wt %, based on the dry weight of the product mixture obtained in method step (b). For the purposes of the present invention, therefore, the iron oxides present in the starting material are converted preferably at least substantially into iron(III) oxide.

As part of the oxidation treatment, there may likewise be provision for the further metals as well, more particularly copper, zinc, lead and/or cobalt, to be further oxidized, more particularly to give copper(II) oxide, zinc(II) oxide, lead(II) oxide and/or cobalt(II) oxide. This as well is useful for the subsequent chlorination of these metals. Similar comments apply in respect of the metals titanium, manganese, vanadium and chromium.

Provision is made in particular in accordance with the invention, therefore, for the product mixture obtained in the oxidation treatment in method step (b) to comprise the further metal in the form of the metal oxide, preferably in the form of copper(II) oxide, zinc(II) oxide, lead(II) oxide and cobalt(II) oxide. The product mixture obtained in the oxidation treatment in method step (b) may in particular comprise silver oxide. Accordingly there may also, optionally, be a further oxidation of the noble metal in the form of silver as part of the oxidation treatment.

Furthermore, the product mixture resulting from the oxidation may comprise silicon dioxide ($SiO_2$) and also calcium sulfate ($CaSO_4$), which, so to speak, each remain at least substantially unchanged in the product mixture.

With regard to the chlorination carried out subsequently as part of the method of the invention, particularly of the resulting oxides of iron from method step (b) and/or the oxides of the further metals resulting in method step (b), and/or, optionally, silver oxide, it is preferred in accordance with the invention if in method step (c) the chlorination is carried out as a solid phase reaction.

In this context, in method step (c), the oxidation products obtained in method step (b) and/or the product mixture obtained in the oxidation treatment in method step (b) ought to be brought to temperatures in the range from 100° C. to 320° C., more particularly in the range from 150° C. to 302° C., preferably in the range from 180° C. to 300° C. In method step (c), in particular, the chlorination ought to be carried out at temperatures in the range from 100° C. to 320°

C., more particularly in the range from 150° C. to 302° C., preferably in the range from 180° C. to 300° C.

As far as the chlorination as per method step (c) is further concerned, it may be carried out in chlorinating devices well-known per se to the skilled person. In particular, the chlorination in method step (c) may be carried out in a chlorinating device, in particular where the chlorinating device is selected from the group of rotary kilns and drum kilns.

With further regard to the chlorination, it is especially advantageous in accordance with the invention if the procedure is such that in method step (c) iron, more particularly iron(III) oxide, is converted into iron chloride, more particularly iron(III) chloride ($FeCl_3$).

As observed above, the iron(III) chloride or $FeCl_3$ which results in a preferred way has optimum removing properties in terms of the method regime of the invention, particularly in respect of the sublimation properties of iron(III) chloride.

In particular, according to one inventively preferred embodiment, whereby, as observed in detail further below, the chlorinating agent used is ammonium chloride ($NH_4Cl$), the conversion of iron(III) oxide into the corresponding chloride may be carried out according to the following reaction equation (iii):

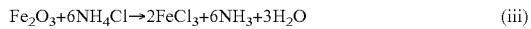

$$Fe_2O_3 + 6NH_4Cl \rightarrow 2FeCl_3 + 6NH_3 + 3H_2O \quad \text{(iii)}$$

Equally, in accordance with the method regime of the invention, with the chlorination of the metal oxides obtained beforehand and/or present in the product mixture, provision may be made for copper, more particularly copper oxide, preferably copper(II) oxide, to be converted in method step (c) into copper chloride, more particularly copper(II) chloride ($CuCl_2$). Equally, provision may be made in method step (c) to convert zinc, more particularly zinc oxide, preferably zinc(II) oxide into zinc chloride, more particularly zinc(II) chloride ($ZnCl_2$) Moreover, provision may be made in method step (c) to convert lead, more particularly lead oxide, preferably lead(II) oxide into lead chloride, more particularly lead(II) chloride ($PbCl_2$). Moreover, provision may be made in method step (c) to convert cobalt, more particularly cobalt oxide, preferably cobalt(II) oxide, into cobalt chloride, more particularly cobalt(II) chloride ($CoCl_2$). Furthermore, in method step (c), titanium, more particularly titanium oxide, may be converted into titanium chloride. Moreover, in method step (c), manganese, particularly manganese oxide, may be converted into manganese chloride. Equally in method step (c) vanadium, more particularly vanadium oxide, may be converted into vanadium chloride. Finally, in method step (c), chromium, more particularly chromium oxide, may be converted into chromium chloride.

Furthermore, equally, in method step (c), silver, more particularly silver oxide, preferably silver(I) oxide, may be converted into silver chloride, more particularly silver(I) chloride (AgCl).

In the context of the present invention it has proven particularly advantageous if in method step (c) the chlorination is carried out using ammonium chloride ($NH_4Cl$) as chlorinating agent. In particular, therefore, ammonium chloride ($NH_4Cl$) ought to be used as chlorinating agent in method step (c). In this context, provision may be made in particular for the ammonium chloride ($NH_4Cl$) to be used as especially particulate solid and/or as pure substance. The inventively preferably envisaged use of a specific chlorinating agent in the form of ammonium chloride is associated in particular with the advantage that ammonium chloride as such is outstandingly suitable for recycling and, furthermore, has good applications properties, not least in respect of its relatively low toxicity and its presence as a solid, which also improves meterability.

In accordance with the invention, the chlorinating agent, more particularly ammonium chloride, may be supplied to the chlorinating device or introduced into the chlorinating device for the purposes of the chlorination of the oxidation products and/or of aforementioned metals.

In particular in relation to the use of a specific chlorinating agent in the form of ammonium chloride, the conditions within the method of the invention may be such that in method step (c), in the chlorination, especially gaseous ammonia ($NH_3$) and, optionally, especially gaseous water, preferably especially gaseous ammonia ($NH_3$), results or result. In this context, in particular, gaseous ammonia ($NH_3$) may result as a reaction product originating from the chlorination from the chlorinating agent, more particularly ammonium chloride ($NH_4Cl$). In this regard, reference may be made in particular to the reaction equation (iii) above.

In accordance with the invention, provision may be made in particular for the chlorinating agent used in method step (c), more particularly ammonium chloride ($NH_4Cl$), to be recycled by recovery and/or removal of reaction products resulting from the chlorinating agent in the chlorination of the aforementioned metals and/or oxidation products, more particularly of preferably gaseous ammonia ($NH_3$), and by subsequent reaction of the reaction products, more particularly of preferably gaseous ammonia ($NH_3$), with a preferably inorganic chlorine compound, more particularly hydrogen chloride (HCl).

In particular, the recycling of the chlorinating agent, more particularly ammonium chloride ($NH_4Cl$), may be carried out in a reaction or condensation device.

In this context, in accordance with the invention, the procedure, for example, may be such that ammonia ($NH_3$) resulting in the chlorination of the metals and/or oxidation products is taken off from the chlorinating device and introduced into a reaction or condensation device, where it is reacted with the inorganic chlorine compound likewise introduced into the reaction or condensation device, more particularly hydrogen chloride (HCl), in order to give ammonium chloride ($NH_4Cl$). In this way, the chlorinating agent, more particularly in the form of ammonium chloride ($NH_4Cl$), can be recycled and supplied again to the chlorinating operation. On the basis of this inventive procedure, therefore, a further method optimization is ensured in the context of the present invention.

With regard to the reaction or conversion of ammonia ($NH_3$), on the one hand, and of the inorganic chlorine compound, more particularly hydrogen chloride (HCl), on the other, this reaction or conversion underlying recycling of the chlorinating agent, the reaction or conversion may take place in particular in the gas phase, in particular with resulting ammonium chloride ($NH_4$) resulting or condensing in solid phase. On the basis of this specific inventive procedure therefore, especially particulate ammonium chloride is obtained as a solid in high purity, this being associated with corresponding advantages in the context of the subsequent chlorination.

In particular, therefore, provision may be made in the present invention for the reaction products resulting from the chlorinating agent, more particularly ammonia ($NH_3$) on the one hand and the preferably inorganic chlorine compound, more particularly hydrogen chloride (HCl) on the other, to be reacted in the gas phase, in particular to give ammonium chloride ($NH_4Cl$), preferably as an especially particulate solid and/or as pure substance.

The underlying reaction for the recycling of ammonium chloride may take place in particular according to the following reaction equation (iv):

$$NH_3 + HCl \rightarrow NH_4Cl. \tag{iv}$$

In accordance with the invention, provision may further be made for the resulting or recycled chlorinating agent, more particularly ammonium chloride ($NH_4Cl$), to be used again in method step (c), more particularly by renewed supply or renewed introduction into the chlorinating device. In particular the resulting or recycled chlorinating agent, more particularly ammonium chloride ($NH_4Cl$), may be supplied again to the oxidation products for chlorination and/or to the product mixture resulting from method step (b), in method step (c).

According to a further inventively preferred embodiment, provision may be made in particular, in relation to the recycling of the chlorinating agent, for the preferably inorganic chlorine compound, more particularly hydrogen chloride (HCl), to be obtained in the course of a reduction—described in more detail later on below—of the products obtained in method step (c), more particularly by reduction of iron chloride, preferably iron(III) chloride ($FeCl_3$), more particularly with use of a reducing agent, preferably hydrogen or natural gas (especially methane), more preferably hydrogen.

Equally, the inorganic chlorine compound, more particularly hydrogen chloride (HCl), that is used for the recycling may also be obtained from the optional reduction of the chlorides of the further metals obtained in method step (c), more particularly as defined above.

In view of the concept according to the invention, with the specific recycling of the chlorinating agent, the respective substances or reactants can be provided within the method of the invention itself, meaning that there is so to speak a closed circuit in terms of the chlorinating agent, this going hand in hand with a reduced level of chemicals used and hence also, in particular, with an improved environmental and economic balance on the part of the method of the invention.

With further regard to the method of the invention, it is preferred in accordance with the invention if in method step (d) there is removing and/or isolating of iron chloride, more particularly iron(III) chloride ($FeCl_3$), from the product mixture obtained in method step (c).

In this context it has in accordance with the invention emerged as being particularly advantageous if the removing and/or isolating of iron chloride, more particularly iron(III) chloride, from the product mixture obtained in method step (c) takes place by sublimation, more particularly at temperatures in the range from 200° C. to 400° C., more particularly in the range from 250° C. to 375° C., preferably in the range from 275° C. to 350° C., more preferably in the range from 300° C. to 325° C.

As a result of the selective sublimation of iron chloride, more particularly iron(III) chloride ($FeCl_3$), from the product mixture it is possible to realize a controlled or isolated removing of the iron component from the product mixture, so that on this basis, so to speak, the main component of the starting material used, namely iron, can be isolated or removed, specifically in the form of the corresponding iron chloride. This selective sublimation or removing of iron chloride takes place in particular on the basis of the deliberate selection of the sublimation temperature. The reason is—without wishing to be confined to this theory—that the iron chloride, more preferably iron(III) chloride ($FeCl_3$), that is to be removed and/or isolated has sublimation properties differing from those of the chlorides of the further metals and/or further components in the product mixture, especially in terms of the fact that iron chloride, particularly in comparison to the other chlorides, has a lower sublimation temperature. Through the specific selection of the sublimation temperature it is possible, therefore, to carry out selective removal of the iron component from the product mixture.

In this context, the removing or isolating of iron chloride, more particularly iron(III) chloride ($FeCl_3$), may be carried out in a removing device, more particularly sublimation device, preferably in a rotary kiln, drum kiln and/or fluidized bed kiln, into which the product mixture for purification, with the corresponding chlorides, ought to be introduced beforehand.

According to one inventively preferred embodiment, as part of the present invention, a possible procedure adopted, for example, may be such that method step (c), in other words the chlorination of the oxidation products obtained in method step (b), and method step (d), in other words, in particular, the removing and/or isolating of iron chloride, more particularly iron(III) chloride ($FeCl_3$), is accomplished in particular continuously in a common device, the common device being able more particularly to constitute a rotary kiln. In this context, the common device, more particularly the rotary kiln, may have a first section or region for implementation of method step (c), and a second section or region for implementation of method step (d), more particularly for the removing and/or isolating of iron chloride, more particularly iron(III) chloride ($FeCl_3$).

In accordance with this inventive embodiment, therefore, the chlorination on the one hand and the removal of iron chloride on the other may be carried out in one and the same apparatus. As noted above, the joint apparatus is more particularly a rotary kiln, this rotary kiln, along the rotary tube axis, having a first reaction region with a first temperature zone for implementing the chlorination described in method step (c), with the relevant temperatures as provided in accordance with the invention, and having a second sublimation region for the removing of iron chloride, with the corresponding sublimation temperatures, as described in method step (d).

With regard to the iron chloride, more particularly iron (III) chloride ($FeCl_3$), removed from the product mixture and, in particular, sublimed, according to a first inventive embodiment this chloride may be recovered as such: in this context, the removed and/or isolated and in particular sublimed iron chloride, more particularly iron(III) chloride ($FeCl_3$), may be desublimed to give, in particular, solid and/or purified iron chloride, more particularly iron(III) chloride ($FeCl_3$). The desublimation may be carried out in a corresponding desublimation or condensation device. In this context, in particular, gaseous iron chloride may be transferred from the sublimation device into the desublimation device. In this way, in particular, particulate or solid iron chloride is obtained, which as such constitutes an economically relevant industrial or commercial product, particularly with regard to its use as a pigment and/or flocculate and/or precipitant, especially in wastewater treatment plants or the like.

According to a second inventive embodiment, the removed and/or isolated and more particularly sublimed and therefore gaseous iron chloride, more particularly iron(III) chloride ($FeCl_3$), may be reduced to give metallic iron. In this context it is possible to use at least one reducing agent. The reducing agent is preferably hydrogen or natural gas (especially methane), more preferably hydrogen.

The reduction of iron chloride, more particularly iron(III) chloride, ought in particular to take place in the gas phase, especially at temperatures in the range from 400° C. to 800° C., more particularly in the range from 450° C. to 750° C., preferably in the range from 500° C. to 700° C., more preferably in the range from 550° C. to 650° C.

The reduction of iron chloride, especially iron(III) chloride, may be carried out in a reduction device. Such reduction devices are well known for this purpose to the skilled person, meaning that no further observations are needed in this respect. For this purpose it is possible in particular for gaseous iron chloride to be transferred from the sublimation device into the reduction device.

According to one inventively preferred embodiment, and especially where hydrogen or natural gas (more particularly methane) is used as reducing agent, the reduction described above may result not only in metallic iron but also in hydrogen chloride (HCl).

In this context there may equally be provision for, as indicated above, the hydrogen chloride (HCl) resulting in the reduction to be used for the recycling of the chlorinating agent, preferably ammonium chloride ($NH_4Cl$), especially as defined above. In this context there may equally be provision for the especially gaseous ammonia ($NH_3$), on the one hand, and the hydrogen chloride (HCl), on the other, resulting in the chlorination in method step (c), to be combined and/or brought into contact and reacted to give the recycled chlorinating agent, preferably ammonium chloride ($NH_4Cl$). In particular it is possible in this context, as described above, to carry out the procedure in a reaction or condensation device. In this context there may in particular be provision, in accordance with the invention, for the gaseous ammonia ($NH_3$) from the chlorinating device, on the one hand, and the hydrogen chloride (HCl) on the other hand, to be taken off in each case from the reduction device and introduced in each case into the reaction or condensation device, and reacted to give ammonium chloride ($NH_4Cl$).

The metallic iron obtained in this way in accordance with the second inventive embodiment is notable for its high purity. Hence in accordance with the invention it may be the case that the metallic iron obtained has a purity of at least 90 wt %, more particularly at least 95 wt %, preferably at least 98 wt %, more preferably at least 99 wt %, very preferably at least 99.5 wt %, especially preferably at least 99.99 wt %, calculated as element and based on the metallic iron obtained. The high purity of the resulting metallic iron is accompanied by corresponding positive properties of the iron, especially in respect of a high magnetic saturation, high electrical conductivity and good acid resistance.

The high-purity metallic iron obtained on the basis of the method of the invention, as a commercial product, also corresponds in particular to the quality requirements or quality features of so-called carbonyl iron or ARMCO iron.

On the basis of the high proportion of iron in the starting material indicated above, therefore, it is possible in accordance with the invention to realize overall high yields in conjunction with high product quality of the metallic iron obtained.

In accordance with the invention, it is also possible for the first and second embodiments to be carried out simultaneously or in parallel, in particular by corresponding treatment of component streams.

In view of the inventive method regime with the controlled oxidation, chlorination and selective sublimation, the iron component can be isolated effectively and with high yields from the parent starting material. In this context, the product mixture obtained in method step (d) and freed from iron chloride, preferably iron(III) chloride ($FeCl_3$), can have a (residual) iron content of less than 10 wt %, more particularly less than 5 wt %, preferably less than 3 wt %, calculated as element and based on the dry weight of the product mixture. Correspondingly, therefore, in relation to the product mixture obtained in method step (d) and freed from iron, there is a rise in the relative proportion of the other components, and so these components are, so to speak, concentrated in relation to the resulting product mixture, thereby further improving their subsequent removing or purification and leading in this respect to higher yields.

With further regard to the method of the invention, provision may also be made for there to be a further and/or subsequent removing and/or isolation of the chlorides of the further metals from the product mixture in method step (d), in particular following removing and/or isolating of iron chloride, more particularly iron(III) chloride ($FeCl_3$).

In particular, in the context of the present invention, provision may be made for method step (d), especially after removing and/or isolating of iron chloride, more particularly iron(III) chloride ($FeCl_3$), has taken place, to comprise further and/or subsequent removing and/or isolating of copper chloride, more particularly copper(II) chloride ($CuCl_2$), and/or of zinc chloride, more particularly zinc(II) chloride ($ZnCl_2$), and/or of lead chloride, more particularly lead(II) chloride ($PbCl_2$), and/or of cobalt chloride, more particularly cobalt(II) chloride ($CoCl_2$). Similar may apply in respect of titanium chloride, manganese chloride, vanadium chloride and/or chromium chloride.

For this purpose, the further or subsequent removing and/or isolating of chlorides of the further metals from the product mixture may take place, for example, in a slurrying or dispersing device, more particularly in a stirred tank and/or stirred reactor, preferably having at least one withdrawal means, and/or a countercurrent device, preferably having in each case at least one withdrawal means.

In this context, in accordance with the invention, the procedure may for example be such that the product mixture freed in particular from iron chloride, preferably iron(III) chloride ($FeCl_3$), is taken up, more particularly slurried and/or dispersed, in a liquid phase and/or in a liquid medium, more particularly water.

In accordance with this aspect of the present invention, the soluble constituents of the product mixture freed in particular from iron chloride, preferably iron(III) chloride ($FeCl_3$), especially the chlorides of the further metals, more particularly copper chloride, preferably copper(II) chloride ($CuCl_2$), and/or zinc chloride, preferably zinc(II) chloride ($ZnCl_2$), and/or lead chloride, preferably lead(II) chloride ($PbCl_2$), and/or cobalt chloride, preferably cobalt(II) chloride ($CoCl_2$), may in particular be at least substantially completely dissolved and/or suspended, preferably dissolved. In this way, the chlorides in question of the further metals may be removed from the slurried product mixture by transfer into a suspension or solution, with a high rate of removing or purification being achievable by virtue of the good solubility or suspendability of the chlorides.

With regard in general to the removing of the chlorides of the further metals, it may be carried out on the basis of what is called water leaching or on the basis of what are called leaching techniques, well-known per se to the skilled person, and hence requiring no further observations.

In accordance with the invention, provision may be made for the resulting solution and/or suspension, preferably solution, comprising the chlorides in question to be removed from the remaining product mixture, by means for example of filtration or the like, more particularly using corresponding filter devices.

In this context, there may be further work-up of the resulting solution or suspension, for the especially selective removing or isolating of the chlorides of the further metals, more particularly copper chloride, preferably copper(II) chloride, ($CuCl_2$), and/or zinc chloride, preferably zinc(II) chloride ($ZnCl_2$), and/or lead chloride, preferably lead(II) chloride ($PbCl_2$), and/or cobalt chloride, preferably cobalt (II) chloride ($CoCl_2$), and/or titanium chloride, and/or manganese chloride, and/or vanadium chloride and/or chromium chloride, or to give the metallic form of the respective metal. The especially selective removing or isolating of the chlorides of the further metals and/or the conversion to the metallic form of the respective metals may be accomplished on the basis of electrochemical, sorptive, more particularly adsorptive, methods and/or by means of, in particular, selective precipitation and/or, in particular, selective sedimentation or the like. The relevant methods are well-known to the skilled person, and so no further observations are required in this regard.

With regard, therefore, to the removing or isolating of the chlorides of the further metals, a procedure in accordance with the invention is particularly such that the corresponding metal chlorides are transferred into solution and/or suspension and are therefore removed from the at least substantially insoluble constituents of the previously iron-freed product mixture, and the solution or suspension obtained in this way is subjected to selective removing of the chlorides of the further metals.

In this way, in the context of the present invention, it is also possible to remove the corresponding chlorides of the further metals from the parent product mixture based on the starting material used, and so in this way, further industrially and/or technically utilizable raw materials and/or commercial products can be obtained, which are suitable, for example, for use as or in catalysts, for producing dyes and/or pigments, or the like, with the raw materials in question, in the form of the chlorides of the further metals, equally possessing a high physical or product purity.

With regard to the remaining, more particularly at least substantially insoluble product mixture freed from iron and also from the further metals, as defined above, this mixture also comprises, in particular, the noble metal components, more particularly gold and/or silver, and also the constituents silicon, more particularly silicon dioxide, and calcium sulfate. The remaining product mixture may in particular also include silver chloride, which is virtually insoluble in water.

As a result of the upstream removing and/or isolating of the iron component and also of the further metal components from the product mixture, there is a further enrichment or further concentration or an increase in the relative proportion, in particular, of the noble metals as well, such as gold and/or silver, in the remaining product mixture, and this is beneficial to the subsequently and optionally provided removal of the noble metals, not least in relation to the economics of the parent method and also the degrees of yield.

Hence for the purposes of the present invention, provision may be made for the product mixture obtained in method step (d), or present after method step (d) has been implemented, to comprise, calculated in each case as element and based in each case on the dry weight of the product mixture:
  gold, more particularly in amounts in the range from 1 g/t to 50 g/t, preferably in the range from 1 g/t to 40 g/t, more preferably in the range from 2 g/t to 20 g/t, very preferably in the range from 3 g/t to 15 g/t;
  silver, more particularly in amounts in the range from 2 g/t to 600 g/t, preferably in the range from 5 g/t to 500 g/t, more preferably in the range from 10 g/t to 400 g/t, very preferably in the range from 15 g/t to 200 g/t.

With regard to the optionally envisaged removing of the noble metal, a possible procedure, in a manner preferred in accordance with the invention, is that in method step (e) the noble metal, more particularly gold and/or silver, is removed from the product mixture taken up, more particularly slurried and/or dispersed, in a liquid phase and/or in a liquid medium, more particularly water. The removal of the noble metal, more particularly of gold and/or silver, may in particular be carried out in at least one removing and/or filter device. For this purpose, where necessary, the product mixture obtained in method step (d) may again be admixed with a dispersion medium or dissolution medium, more particularly water.

In this context it has proved advantageous in accordance with the invention if in method step (e) the noble metal, more particularly gold and/or silver, is brought or transferred, in particular at least substantially completely, into solution or suspension, more particularly into solution. This may be done, for example, by using at least one complexing component and/or complexing compound to transfer the noble metal, more particularly gold and/or silver, into solution and/or suspension, preferably solution, or contacting it in particular with the product mixture and/or with the noble metal.

Generally speaking, the complexing component or compound in question may be a substance which preferably forms, with the noble metal, more particularly gold and/or silver, a complex compound which is at least substantially entirely soluble or suspendable in the dissolution medium, more particularly water.

The complexing component or compound may more particularly be selected from the group of cyanide liquor, iodine/bromine solution and thiosulfate solution. More particularly it is possible to use a solution of the salt of hydrocyanic acid, more particularly sodium cyanide (NaCN), as a component for transferring the noble metal into a solution and/or suspension.

Suitable more particularly as a relevant component, as noted above, is a sodium cyanide solution, also referred to synonymously as cyanide liquor. The reason is that as part of what is called cyanide leaching, gold and/or silver are dissolved or suspended in a complex compound comprising, in particular, oxygen-containing sodium cyanide solution, especially on the basis of the following reaction equation (v):

$$4Au+8NaCN+O_2+2H_2O \rightarrow 4Na[Au(CN)_2]+4NaOH. \quad (v)$$

For the noble metal in the form of silver, correspondingly, the valid reaction equation is (vi):

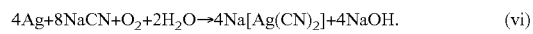

$$4Ag+8NaCN+O_2+2H_2O \rightarrow 4Na[Ag(CN)_2]+4NaOH. \quad (vi)$$

Subsequently there may further be provision for the resulting solution and/or suspension of the noble metal, more particularly gold and/or silver, to be removed from the remaining product mixture, in particular by means of filtration, and for the noble metal, more particularly gold and/or silver, to be recovered from the solution and/or suspension, more particularly by means of precipitation methods or sorptive, especially adsorptive, methods.

For example, there may be a precipitation of the noble metal using zinc and/or aluminum, preferably in finely particulate form, more particularly on the basis of the following reaction equations (vii) and (viii):

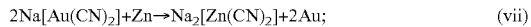

2Na[Au(CN)$_2$]+Zn→Na$_2$[Zn(CN)$_2$]+2Au;  (vii)

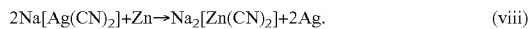

2Na[Ag(CN)$_2$]+Zn→Na$_2$[Zn(CN)$_2$]+2Ag.  (viii)

The precipitation of the noble metal may be followed by a further filtration and purification of the crude noble metal obtained.

According to a further embodiment of the present invention, it is also possible to use sorptive, more particularly adsorptive, purification methods in order to obtain the noble metal, based in particular on a preferably particulate adsorption material, more particularly active carbon. For this purpose it is possible to operate with corresponding adsorption columns or the like. In principle it is also possible to employ further recovery or purification methods, such as amalgam methods and/or anode slurry methods, to obtain the noble metal.

On the basis of the method of the invention, therefore, efficient recovery or purification even of noble metals from the parent starting material is possible, with high yield rates being obtained in this respect, not least under the consideration that the noble metals in question are already concentrated, so to speak, in the product mixture under treatment, as a result of the upstream removal of the respective metal components. On the basis of the method of the invention, very high purities can be obtained even for the purified and isolated noble metals.

In the present invention, moreover, one particular possible approach is that the product mixture obtained in method step (d) and/or in method step (e) further comprises silicon originating from the starting material, more particularly in the form of a silicon oxide, preferably silicon dioxide. Equally, in the present invention, it may be the case that the product mixture obtained in method step (d) and/or in method step (e) further comprises at least one alkali metal and/or alkaline earth metal originating from the starting material, more particularly at least one alkaline earth metal, preferably calcium. The alkali metal or alkaline earth metal, more particularly the alkaline earth metal, preferably calcium, may be present in particular in the form of at least one salt, more particularly sulfate. In particular, the product mixture obtained in method step (d) or in method step (e) may comprise calcium sulfate originating from the starting material. Indeed, as regards the aforementioned components specifically, they are at least substantially not removed from the product mixture or chemically modified, on the basis of the method steps recited for the purification of the respective metal components and/or noble metal constituents, and, consequently, they are present as such at least substantially completely in the remaining product mixture.

In this context, in accordance with the invention, and in relation to the remaining product mixture, it is possible to envisage in particular a further removing or processing of silicon dioxide. For example, reduction to silicon may take place, based for example on the following reaction equation (ix):

SiO$_2$+C→Si+CO$_2$.  (ix)

With regard, furthermore, to the calcium sulfate remaining in the product mixture, it may be utilized as such, for the purpose of producing gypsum building materials or the like, for example.

The present invention relates equally, in accordance with this aspect of the present invention, to a method for obtaining raw material from ores and/or ore residues, more particularly a method for the recovery of metals from ores and/or ore residues, preferably from pyrite residues, more preferably from roasted pyrites obtained in the production of sulfuric acid, more particularly as defined above, where the method comprises the following method steps:

(a) providing, more particularly processing, of a starting material in the form of at least one ore and/or ore residue, more particularly of at least one pyrite residue, preferably of one or more roasted pyrites obtained in the production of sulfuric acid, where the starting material comprises
 i) iron, preferably as main constituent, and
 ii) at least one noble metal, more particularly gold and/or silver, and also
 iii) at least one further metal, preferably selected from the group of copper, zinc, lead, cobalt, titanium, manganese, vanadium and chromium, more preferably selected from the group of copper, zinc, lead and cobalt (b) oxidation treatment, more particularly calcining and/or oxidative roasting, of the starting material provided in method step (a), preferably using at least one oxidizing agent, more particularly oxygen, more particularly to give iron-oxide and optionally oxides of the further metals, where, in the oxidation treatment, iron is converted at least substantially completely into the trivalent form, more particularly into iron(III), preferably into iron(III) oxide, and/or where, in the oxidation treatment, iron(III) is obtained, and/or where, in the oxidation treatment, iron(II, III) oxide and/or iron(II) oxide are converted into iron(III) oxide;

(c) chlorination of the oxidation products, more particularly oxides, obtained in method step (b), preferably using at least one recyclable chlorinating agent, preferably chlorination of iron oxide and optionally of the oxides of the further metals, more particularly to give iron chloride, more particularly iron(III) chloride (FeCl$_3$) and optionally chlorides of the further metals, where ammonium chloride (NH$_4$Cl) is used as chlorinating agent, where ammonia (NH$_3$) results as reaction product arising in the chlorination from ammonium chloride (NH$_4$Cl),
 where the ammonium chloride (NH$_4$Cl) is recycled by recovery and/or removing of the ammonia (NH$_3$) and subsequent reaction of the ammonia (NH$_3$) with a preferably inorganic chlorine compound, more particularly hydrogen chloride (HCl), and
 where the recycled ammonium chloride (NH$_4$Cl) is used again for chlorination of the oxidation products obtained in method step (b);

(d) removing of the chlorinated products obtained in method step (c), more particularly of iron chloride, preferably iron(III) chloride (FeCl$_3$), and optionally chlorides of the further metals, from the product mixture obtained in method step (c),
 where the removing of iron chloride, more particularly iron(III) chloride (FeCl$_3$) from the product mixture takes place by sublimation, where the separated iron chloride, more particularly iron(III) chloride (FeCl$_3$), is desublimed to give, in particular, solid and/or purified iron chloride, more particularly iron(III) chloride (FeCl$_3$), or
 where the separated and in particular sublimed iron chloride, more particularly iron(III) chloride (FeCl$_3$), is reduced to give metallic iron, where hydrogen is used as reducing agent and where, in the reduction, hydrogen chloride (HCl) results, in particular where the hydrogen chloride (HCl) is used for the recycling of ammonium chloride (NH$_4$Cl), more particularly as defined in method step (c);

(e) optionally removing of the noble metal, more particularly of gold and/or silver, from the product mixture obtained in method step (d);

where the above-stated method steps (a) to (e) are carried out in the order listed above.

In particular, the method of the invention may also be carried out using the recovery plant, defined below, according to the invention.

As observed above, the method of the invention is further described by the relevant co-independent method claims and dependent claims, and also by the reference to the corresponding figures.

All in all, therefore, on the basis of the present invention, a highly efficient method is provided for the purification or isolation, more particularly for selective and comprehensive purification or isolation, of metals, especially for the purpose of obtaining metallic iron, and also further metal components and optionally noble metals, such as gold and silver, more particularly from pyrite cinder, such as roasted pyrites.

According to one particular embodiment of the present invention, a possible procedure is for roasted pyrites previously dried at 120° C. to be subjected to oxidative roasting at 700° C. with the aim of converting iron into the trivalent form. Thereafter the oxidized roasted pyrites may be treated with solid ammonium chloride at a temperature of 300° C. to convert iron into the chloride form, to give ammonia and water in the gas phase. Subsequently, the iron chloride obtained may be removed from the product mixture by sublimation. This iron chloride is transferred into the gas phase, or sublimed, at a temperature of 950° C., with silicon dioxide and calcium sulfate and also the chlorides of the further metals, and the noble metal components, remaining in the solid product mixture. The remaining product mixture has an increased noble metal content by comparison with the starting material. Iron chloride can subsequently be reduced or treated with hydrogen to give metallic iron and hydrogen chloride gas. The gas streams of ammonia and hydrogen chloride can be combined for renewed formation of ammonium chloride, and reacted. From the product mixture remaining after the removal of iron chloride, the chlorides of the further metals may be transferred into solution by slurrying and removed. The residual product mixture thus obtained, after removal of the chlorides of the further metals, may be treated with a cyanide solution in order to convert gold and silver into a soluble form. The residual which remains in the purified product mixture, and which comprises a mixture of silicon dioxide (quartz) and calcium sulfate (gypsum), can be removed by filtration from the solution comprising gold and/or silver. Finally, the noble metal can be obtained in the form of gold and/or silver by precipitation.

In the text below, the present invention on the basis of the method of the invention is elucidated in more detail using preferred working examples and figures or drawings that show embodiments. In connection with the elucidation of these preferred working examples of the method of the invention, which, however, are in no way restrictive on the method of the invention, further advantages, properties, aspects and features of the present invention are also shown.

In the figures

Figure 2:
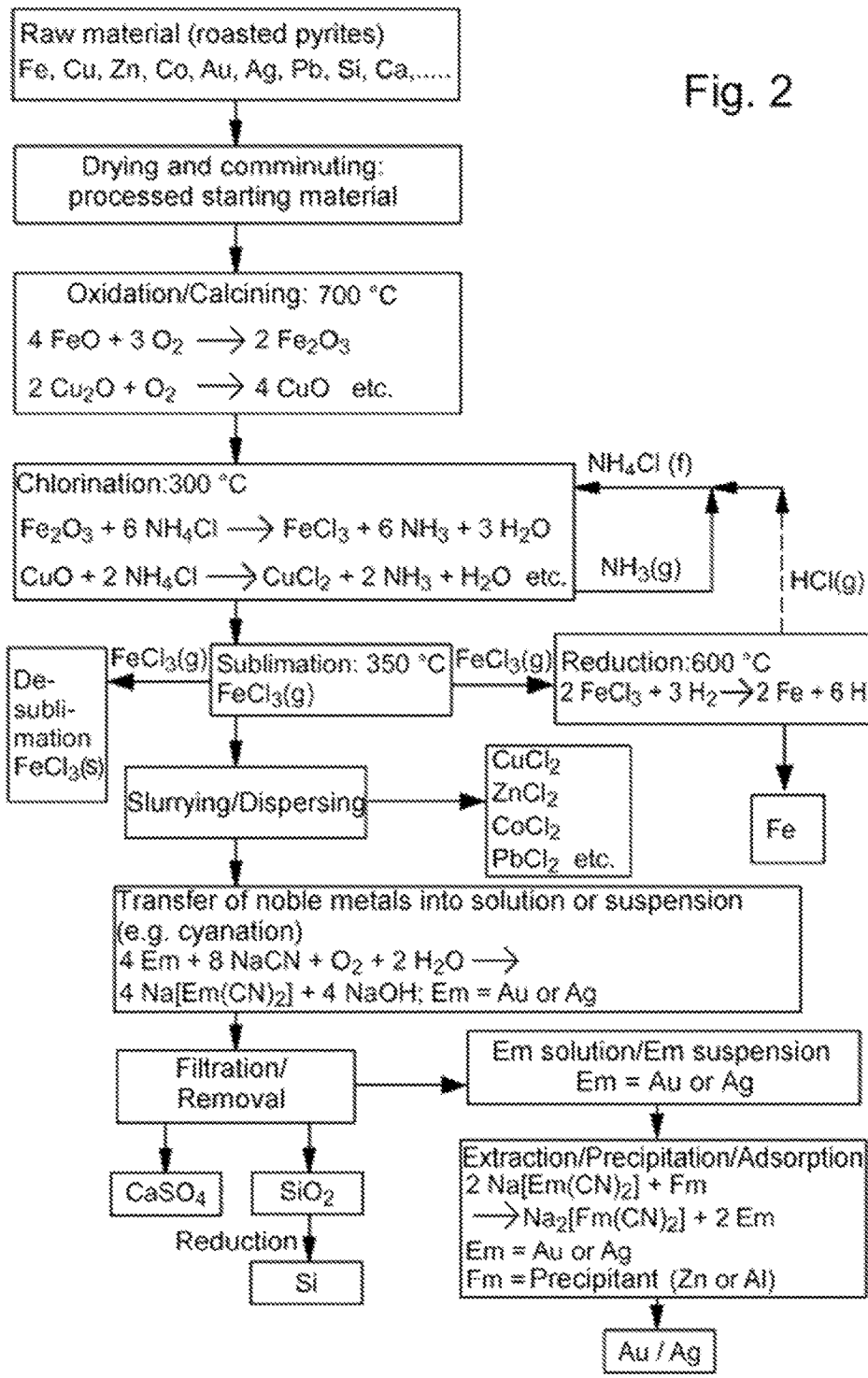
FIG. 2 shows a further schematic representation or overview of the method of the invention, according to a further inventively preferred embodiment.

FIG. 1 shows a schematic representation or overview of the method of the invention for obtaining raw material from ores or ore residues, more particularly for recovering metals from ores or ore residues, preferably for recovering metals from pyrite residues, more preferably from roasted pyrites obtained in the production of sulfuric acid;

FIG. 2 shows a further schematic representation or overview of the method of the invention, according to a further inventively preferred embodiment.

FIG. 1 schematizes one particular embodiment of the method of the invention, as will be further defined below.

In particular, FIG. 1 shows the regime of the invention, whereby first of all a raw material RM is present or is provided, this material more particularly being an ore or an ore residue, more particularly a pyrite residue or, in particular, roasted pyrites obtained from sulfuric acid production. The raw material RM comprises, in particular, iron, preferably as main constituent, and at least one noble metal, more particularly gold and/or silver, and also at least one further metal, preferably selected from the group of copper, zinc, lead and cobalt, with, in particular, iron and also the further metal being present in the form of oxides.

In method step (a) there is a provision, more particularly processing, of a starting material AM on the basis of the parent raw material RM. The processing may comprise comminution of the raw material RM and/or drying of the raw material RM to give the processed starting material AM.

After that, the starting material AM, as shown in FIG. 1, is subjected as per method step (b) to an oxidation treatment, which may be carried out in particular as calcining or oxidative roasting. In this context, an oxidizing agent, such as air and/or oxygen, may in particular be used. This results in a material OP with corresponding oxidation products, the oxidation products comprising, in particular, iron oxide and optionally oxides of the further metals. Particularly in relation to iron oxide, iron(III) oxide is obtained in this context.

FIG. 1 further shows that in a further method step (c) there is a chlorination of the oxidation products, more particularly oxides, obtained in method step (b), resulting correspondingly in chlorinated products CP. The chlorination of the oxides may take place by means of a recyclable chlorinating agent, especially ammonium chloride (NH$_4$Cl). The result on the one hand, starting from iron(III) oxide, is correspondingly iron(III) chloride (FeCl$_3$), and, starting from the further metal oxides, corresponding chlorides of the further metals (Me$_x$-Cl$_y$) where Me=Cu, Zn, Pb, Co, Ti, V or Cr, more particularly Cu, Zn, Pb or Co).

The chlorinated products CP obtained by the chlorination may then be removed or isolated from the product mixture obtained in method step (c), as illustrated by FIG. 1 in accordance with the method step (d) recited therein. In particular, the iron(III) chloride (FeCl$_3$) obtained beforehand in method step (c) may be sublimed in method step (d), giving gaseous iron(III) chloride (FeCl$_3$(g)), which may be removed accordingly from the solid residual mixture.

In this context, FIG. 1 further shows that the resulting, especially gaseous iron(III) chloride can be desublimed on the one hand, to give solid iron(III) chloride, and that, on the other hand, the especially gaseous iron(III) chloride can be subjected to reduction to give metallic iron (Fe). The reaction products arising during the reduction of iron(III) chloride to metallic iron, especially in the form of an inorganic chlorine compound, preferably hydrogen chloride, may be used for the recycling of the chlorinating agent, as illustrated also schematically in FIG. 1, with the inorganic chlorine compound obtained from the reduction, preferably hydrogen chloride, being reacted with reaction product resulting from the chlorinating agent in the chlorination, more particularly with gaseous ammonia (NH$_3$), so that in this way the chlorinating agent is obtained again in the form of ammonium chloride (NH$_4$Cl) which can be used again in method step (c).

FIG. 1 shows, furthermore, that in method step (d) there may also be removal of the chlorides of the further metals (Me$_x$Cl$_y$), in particular downstream of the removal of iron (III) chloride. Method step (d) results in a remaining product mixture (VP), which optionally, in method step (e), as also illustrated in FIG. 1, may be supplied to a further purification procedure, particularly in relation to the removal of noble metals, such as gold and/or silver. The solid product mixture remaining in method step (e) and freed from gold and/or silver comprises, in particular, calcium sulfate and silicon dioxide, and silicon dioxide, as recited in FIG. 1, can be subjected to reduction to give elemental silicon.

FIG. 2 schematizes one further particular embodiment of the method of the invention, as further described below:

Accordingly, as set out in FIG. 2, starting from a raw material such as, in particular, roasted pyrites, comprising components based on iron, copper, zinc, cobalt, gold, silver, lead, silicon and calcium, and also based on further elements, a processed starting material may be obtained by drying and comminuting.

The resulting starting material may be subjected to oxidation or calcining, at temperatures, for example, of 700° C., in the presence of an oxidizing agent, such as air and/or oxygen. The oxidizing treatment leads in particular to oxides being obtained, also in particular with an increase in the oxidation state of the respective metallic elements. Thus in the case of iron, for example, starting from iron(II) oxide or iron(II, III) oxide, iron(III) oxide is obtained fundamentally, in accordance with the following reaction scheme:

$$4FeO + 3O_2 \rightarrow 2Fe_2O_3. \tag{x}$$

Equally, starting for example from copper(I) oxide, copper(II) oxide is obtained fundamentally, in accordance with the following reaction scheme:

$$2Cu_2O + O_2 \rightarrow 4CuO. \tag{xi}$$

Similar comments apply generally in respect of the elements of the further metals.

With regard furthermore to the noble metal, especially gold, it is generally not oxidized as part of the oxidation treatment, owing to its noble properties. For silver as the noble metal, there may be at least partial conversion into the oxide.

FIG. 2 illustrates, furthermore, by way of example, the chlorination, following the oxidation, of the oxidation products obtained beforehand, using a chlorinating agent in the form of ammonium chloride, which can be added to the oxidation products in solid form, in the form of a powder, for example. The chlorination may take place for example at temperatures of 300° C. The result in relation to iron(III) oxide, correspondingly, is iron(III) chloride (FeCl$_3$) and also, purely by way of example, the result for copper oxide, correspondingly, is copper chloride (CuCl$_2$). Similar comments apply in respect of the oxides of the further metals. In the chlorination that is carried out, especially gaseous ammonia (NH$_3$) may result as a reaction product originating from the chlorinating agent, especially ammonium chloride (NH$_4$Cl).

FIG. 2 further illustrates in this context how the resulting, in particular gaseous, ammonia (NH$_3$) can be taken off and reacted in the gas phase with an inorganic chlorine compound, more particularly hydrogen chloride, to give recycled chlorinating agent, more particularly ammonium chloride (NH$_4$Cl).

With regard to the further procedure, the resulting chlorinating products, especially iron chloride and optionally the chlorides of the further metals, may be removed from the product mixture obtained in the chlorination: hence FIG. 2 further illustrates how iron(III) chloride (FeCl$_3$) may be transferred into the gas phase by sublimation, more particularly at temperatures of 350° C., and so removed from the product mixture.

After sublimation and/or removal of iron(III) chloride, it is possible, as shown in FIG. 2, for the chlorides of the further metals, such as CuCl$_2$, ZnCl$_2$, CoCl$_2$, PbCl$_2$, etc., to be removed from the product mixture, in particular by slurrying and/or dispersing of the product mixture freed from iron(III) chloride, with corresponding transfer of soluble chlorides into a solution, more particularly aqueous solution, or suspension, with subsequent removal of the solution or dispersion.

With regard, furthermore, to the iron(III) chloride present as a result of sublimation and present, in particular, in the gaseous state, the method of the invention allows the operation to take place on the basis of two different embodiments, as shown in FIG. 2: on the one hand, the iron(III) chloride, more particularly in gaseous form, may be desublimed by desublimation to solid iron(III) chloride, to give the corresponding end product. On the other hand, iron(III) chloride, more particularly gaseous iron(III) chloride, may be subjected to reduction, in particular at 600° C., and hydrogen, for example, may be used as reducing agent. The reduction may take place in particular in accordance with the following chemical reaction equation: $2FeCl_3 + 3H_2 \rightarrow 2Fe + 6HCl$. In this way, metallic iron is obtained. In the context of the present invention it is equally possible for both above-recited embodiments to be realized simultaneously or in parallel.

FIG. 2 further illustrates how hydrogen chloride obtained during the reduction of iron(III) chloride can be taken off and used for the recycling of the above-recited chlorinating agent.

With regard, furthermore, to the product mixture freed from the chlorides of the aforementioned metals, it is equally possible for the noble metal, more particularly gold and/or silver, to be removed, as shown in FIG. 2: for example, the noble metals, such as gold and/or silver, may be converted into solution or suspension, more particularly aqueous solution or suspension, by means in particular of a complexing reaction, through the use of a corresponding cyanide liquor, for example. The underlying complex-forming reaction to give, in particular, water-soluble noble metal may be run on the basis of the subsequent reaction equation: $Em + 8NaCN + O_2 + 2H_2O \rightarrow 4Na[Em(CN)_2] + 4NaOH$; Em=Au or Ag.

FIG. 2 further illustrates how the noble metals transferred into solution or suspension, especially gold and/or silver, can be purified further by corresponding filtration or removal of the solid constituents, to give a purified noble metal solution or noble metal suspension. From this solution or suspension, the isolated noble metal, more particularly gold and/or silver, may be attained by means of extraction or extractive precipitation or adsorption. In this context, FIG. 2 shows, by way of example, the underlying reaction using a precipitant such as zinc or aluminum: $2Na[Em(CN)_2] + Fm \rightarrow Na_2[Fm(CN)_2] + 2Em$; Em=Au or Ag and also Fm=precipitant (Zn or Al).

With regard, furthermore, to the product mixture which remains, it comprises, in particular, calcium sulfate and also silicon dioxide; silicon dioxide can be converted into silicon by a corresponding reduction, using carbon as reactant, for example, as also shown in FIG. 2.

Furthermore, the present invention—according to a further aspect of the present invention—relates to the recovery plant of the invention, particularly for obtaining raw material from ores and/or ore residues, preferably for recovering metals from ores and/or ore residues, more preferably for recovering metals from pyrite residues, very preferably from roasted pyrites obtained in the production of sulfuric acid, more particularly a recovery plant for implementing the method defined above, where the recovery plant comprises:

(a) at least one providing and/or processing device, more particularly for the providing, more particularly processing, of a starting material in the form of at least one ore and/or ore residue, more particularly of at least one pyrite residue, preferably of one or more roasted pyrites obtained in the production of sulfuric acid, in particular where the starting material comprises iron, at least one noble metal and at least one further metal;

(b) at least one oxidation and/or roasting device, more particularly for the oxidation treatment, more particularly calcining and/or oxidative roasting, of the provided starting material, more particularly to give iron oxide and optionally oxides of the further metals as oxidation products in the resulting product mixture;

(c) at least one chlorinating device, more particularly for the chlorination of the oxidation products, more particularly oxides, in the product mixture and/or for the use of at least one chlorinating agent, more particularly recyclable chlorinating agent, preferably for the chlorination of iron oxide and optionally of the oxides of the further metals, more particularly to give iron chloride and optionally chlorides of the further metals in the product mixture;

(d) at least one removing device, more particularly for the removing of the chlorinated products, more particularly of iron chloride, from the product mixture; and (e) optionally at least one removing and/or filter device, more particularly for the removing of the noble metal, more particularly of gold and/or silver, from the product mixture freed from iron chloride and optionally chlorides of the further metals;

where the above-stated apparatus are arranged in the order indicated downstream of one another in the operating direction.

The recovery plant of the invention is particularly suitable for use in the context of the above-described method according to the invention. In particular, the recovery plant of the invention enables on the one hand an efficient and comprehensive purification or removal of the metallic components from the parent starting material, and in this context, in particular, iron in metallic form, as a raw material for further use, more particularly further industrial use, and also noble metals, in the form of gold and silver, can be obtained. On the other hand, the recovery plant of the invention permits the recycling of the chlorinating agent, envisaged in particular in relation to the method of the invention, which is accompanied by the corresponding economic and environmental advantages.

For further observations in this regard, in respect of the recovery plant according to the invention, reference may be made to the dependent claims relating to the purification plant of the invention, and to the corresponding figures.

The present invention will now be particularized in more detail in relation to the recovery plant of the invention, using preferred working examples and drawings and figures that show embodiments. In connection with the elucidation of these preferred working examples of the present invention, which, however, are in no way restrictive in relation to the present invention, further advantages, properties, aspects and features of the present invention will also be shown.

Figure 3:
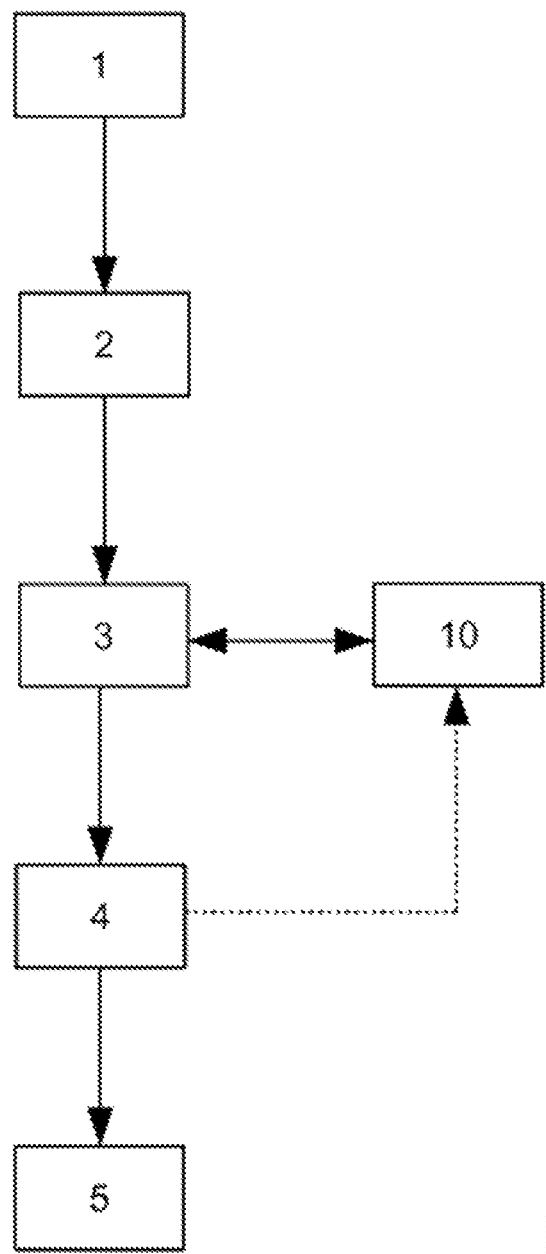
FIG. 3 shows a schematic representation or overview of the recovery plant A of the invention, preferably for obtaining raw material from ores or ore residues, more particularly for recovering metals from ores or ore residues, preferably for recovering metals from pyrite residues, more preferably from roasted pyrites obtained in sulfuric acid production.
Figure 4:
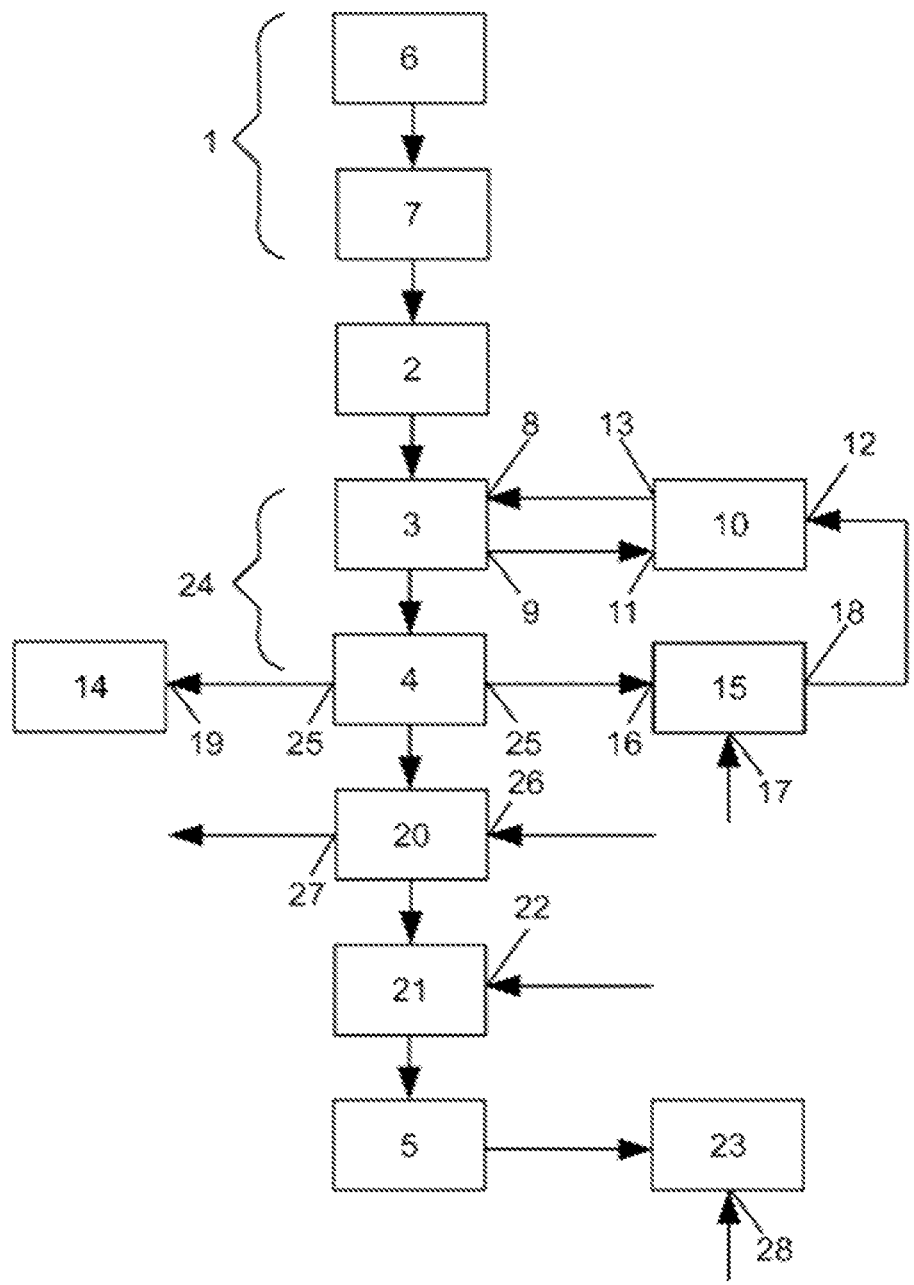
FIG. 4 shows a further schematic representation or overview of the recovery plant A of the invention, in accordance with a further inventive embodiment.

In the further figures:

FIG. 3 shows a schematic representation or overview of the recovery plant A of the invention, preferably for obtaining raw material from ores or ore residues, more particularly for recovering metals from ores or ore residues, preferably for recovering metals from pyrite residues, more preferably from roasted pyrites obtained in sulfuric acid production;

FIG. 4 shows a further schematic representation or overview of the recovery plant A of the invention, in accordance with a further inventive embodiment.

FIG. 3 and FIG. 4 therefore schematize preferred embodiments of the recovery plant A of the invention, as will be further defined below:

In particular, FIG. 3 and FIG. 4 show the recovery plant A of the invention, in particular for obtaining raw material from ores and/or ore residues, preferably for recovering metals from ores and/or ore residues, more preferably for recovering metals from pyrite residues, very preferably from roasted pyrites obtained in the production of sulfuric acid, more particularly a recovery plant A for implementing the above-defined method, where the recovery plant A comprises:

(a) at least one providing and/or processing device 1, more particularly for the providing, more particularly processing, of a starting material in the form of at least one ore and/or ore residue, more particularly of at least one pyrite residue, preferably of one or more roasted pyrites obtained in the production of sulfuric acid, in particular where the starting material comprises iron, at least one noble metal and at least one further metal;

(b) at least one oxidation and/or roasting device 2, more particularly for the oxidation treatment, more particularly calcining and/or oxidative roasting, of the provided starting material, more particularly to give iron oxide and optionally oxides of the further metals as oxidation products in the resulting product mixture;

(c) at least one chlorinating device 3, more particularly for the chlorination of the oxidation products, more particularly oxides, in the product mixture and/or for the use of at least one chlorinating agent, more particularly recyclable chlorinating agent, preferably for the chlorination of iron oxide and optionally of the oxides of the further metals, more particularly to give iron chloride and optionally chlorides of the further metals in the product mixture;

(d) at least one removing device 4, more particularly for the removing of the chlorinated products, more particularly of iron chloride, from the product mixture; and (e) optionally at least one removing and/or filter device 5, more particularly for the removing of the noble metal, more particularly of gold and/or silver, from the product mixture freed from iron chloride and optionally chlorides of the further metals;

where the above-stated apparatus 1, 2, 3, 4, 5 are arranged in the order indicated downstream of one another in the operating direction.

As indicated in detail in FIG. 4, the providing and/or processing device 1 may comprise at least one comminuting means 6, more particularly for comminuting and/or homogenizing the starting material, and/or at least one drying means 7, more particularly for drying the starting material. According to one inventively preferred embodiment, the drying means 7 here may be arranged in operational direction downstream of the comminuting means 6.

With further regard to the inventive recovery plant A, the oxidation or roasting device 2 may be selected from the group of rotary kilns, drum kilns, fluidized bed kilns and entrained flow reactors. In particular the oxidation and/or roasting device 2 may have at least one means for the supply of at least one oxidizing agent, more particularly air and/or oxygen.

Furthermore, the chlorinating device 3 may be selected from the group of rotary kilns and drum kilns.

As can be seen from FIG. 4, the chlorinating device 3 may have at least one supply means 8 for the supply of a chlorinating agent, especially ammonium chloride (Na4Cl). Moreover, the chlorinating device 3 may have at least one takeoff and/or removal means 9, in particular for the recovery and/or removing of reaction products resulting from the chlorinating agent in the chlorination of the oxidation products, more particularly of preferably gaseous ammonia ($NH_3$).

Furthermore, it is also apparent from FIG. 3 and FIG. 4 that the recovery plant A can have at least one reaction and/or condensation device 10. The reaction and/or condensation device is used in particular for combining or contacting and for the reaction of in particular gaseous ammonia ($NH_3$) on the one hand and on the other hand of at least one preferably inorganic chlorine compound, especially hydrogen chloride (HCl), in order to give recycled chlorinating agent, preferably ammonium chloride ($NH_4Cl$).

The reaction and/or condensation device 10 may be connected in particular to the chlorinating device 3, in particular such that, preferably independently of one another, gaseous ammonia can be guided from the chlorinating device 3 into the reaction and/or condensation means 10, and recycled ammonium chloride can be guided from the reaction and/or condensation means 10 into the chlorinating device 3.

On the basis of the apparatus-related peculiarity of the deliberate use of a reaction or condensation device 10, therefore, the recovery plant A of the invention permits the recycling of the chlorinating agent.

In general, the reaction or condensation device 10, as schematized in FIG. 3, is able to receive an inorganic chlorine compound, resulting in connection with the reduction of iron chloride removed from the product mixture in the removing device 4, and this chlorine compound is used for the recycling of the chlorinating agent.

With regard specifically to the reaction or condensation device 10, provision may be made in accordance with the invention for this device, as shown in FIG. 4, to have a supply means 11 for supplying and/or receiving especially gaseous ammonia ($NH_3$), and/or at least one further supply means 12 for supplying and/or receiving at least one preferably inorganic chlorine compound, especially hydrogen chloride (HCl), and/or at least one takeoff and/or removal means 13, more particularly for recovering and/or removing the recycled chlorinating agent, more particularly ammonium chloride ($NH_4Cl$). It is of advantage in accordance with the invention here if the supply means 11 is connected to the takeoff and/or removal means 9 of the chlorinating device 3. It is equally an advantage if the takeoff and/or removal means 13 is connected to the supply means 8 of the chlorinating device 3. In this way, the mass transport of the products and reactants that are relevant to the chlorinating agent is made more efficient and more selective.

With further regard to the inventive recovery plant A, provision may be made according to one inventively preferred embodiment for the removing device 4 to be designed as a sublimation device. In particular, the removing device 4 may be a rotary kiln, drum kiln and/or fluidized bed kiln. The removing device ought also to have at least one means 25 for the withdrawal or takeoff of, in particular, gaseous iron chloride, more particularly iron(III) chloride.

FIG. 4 further illustrates an inventive embodiment whereby the chlorinating device 3 and the removing device 4 can be combined into a common device 24.

In this connection, the common device 24 may be designed in the form of a common rotary kiln, in particular having at least two, preferably two, temperature sections. In the first temperature section or in the first temperature zone, in particular, the temperature may be that needed for the chlorination of the metal components, and the chlorination of the metal components in the material with the oxidation products obtained beforehand may take place by addition of the chlorinating agent; the resulting product mixture with the chlorinated metal components may subsequently be transferred into the second temperature section or into the second temperature zone, where, in the second temperature section or in the second temperature zone, the temperatures present may be those required for the sublimation in particular of iron(III) chloride. In this connection, the common device 24 ought to have the corresponding means for the supply of the chlorinating agent and also for the takeoff of reaction products resulting from the chlorinating agent in the chlorination, more particularly ammonia (NH3), and ought also to have at least one further means 25 for the withdrawal or takeoff of, in particular, gaseous iron chloride, more particularly iron(III) chloride ($FeCl_3$), as it results during the sublimation.

Furthermore, FIG. 4 shows an inventive embodiment whereby the recovery plant A further has at least one desublimation device 14, more particularly for receiving and desubliming, in particular, sublimed iron chloride, more particularly iron(III) chloride ($FeCl_3$), and/or for obtaining, in particular, solid or purified iron chloride, more particularly iron(III) chloride ($FeCl_3$). This desublimation device 14 ought to be connected to the removing device 4, more particularly to the means 25 of the removing device 4 for the removal or takeoff of, in particular, gaseous iron chloride, more particularly iron(III) chloride ($FeCl_3$). In this connection, the desublimation device 14 ought to have at least one supply means 19, more particularly for receiving, in particular, sublimed iron chloride, especially iron(III) chloride ($FeCl_3$), preferably from the removing device 4.

The desublimation device may be designed, for example, as a cooling and/or condensation device.

FIG. 4 further shows an embodiment according to the invention whereby the plant (A) also has at least one reduction device (15), more particularly for reducing, in particular, sublimed iron chloride, more particularly iron(III) chloride ($FeCl_3$), and for obtaining metallic iron. In this connection, the reduction device (15) ought to be connected to the removing device 4. Furthermore, the reduction device 15 ought to have at least one supply means 16, more particularly for receiving, in particular, sublimed iron chloride, especially iron(III) chloride ($FeCl_3$), preferably from the removing device (4).

As observed above, the reduction device 15 may in particular be connected to the removing device 4, more particularly for receiving iron chloride. The reduction device 15 in this case is preferably connected via the supply means 16 to the means 25 for the removal and/or takeoff of, in particular, sublimed iron chloride, more particularly iron(III) chloride ($FeCl_3$).

With further regard to the reduction device 15, it may have at least one further supply means 17 for supplying and/or receiving a reducing agent, more particularly hydrogen or natural gas (especially methane).

In particular, moreover, the reduction device 15 may be connected to the reaction and/or condensation device 10, in particular for delivering an inorganic chlorine compound, more particularly hydrogen chloride, that is produced in the course of the reduction of iron chloride, and for receiving it into the reaction and/or condensation device. In this connection, the reduction device 15 may have at least one withdrawal and/or exporting means 18, especially for recovering and/or removing at least one inorganic chlorine compound, especially hydrogen chloride (HCl), formed in the reduction of iron chloride, especially iron(III) chloride, and/or for taking off at least one inorganic chlorine compound, more particularly hydrogen chloride (HCl), formed in the reduction of iron chloride, more particularly iron(III) chloride. In particular, the takeoff means 18 ought to be connected to the supply means 12 of the reaction or condensation device 10.

In this way, the inorganic chlorine compound that is needed for the recycling of the chlorinating agent may be provided via the reduction of iron chloride from the very procedure on which the recovery plant is based, and may be transferred, with the recovery plant A of the invention providing the constructional requirements in this respect, as observed above.

FIG. 4 shows a further embodiment of the inventive plant A, whereby the plant A further has at least one slurrying or dispersing device 20, more particularly for removing and/or isolating copper chloride, especially copper(II) chloride ($CuCl_2$), and/or zinc chloride, especially zinc(II) chloride ($ZnCl_2$), and/or lead chloride, especially lead(II) chloride ($PbCl_2$), and/or cobalt chloride, especially cobalt(II) chloride ($CoCl_2$), from the product mixture freed from iron chloride, more particularly iron(III) chloride ($FeCl_2$).

In this context, the slurrying or dispersing device 20 ought to be arranged in operational direction downstream from the removing device 4 and/or in operational direction upstream from the removing or filter device 5. The purpose in particular of the slurrying or dispersing device 20 is to slurry or disperse the product mixture freed from iron chloride, especially iron(III) chloride ($FeCl_3$), with the aforementioned chlorides of the further metals being converted into a solution or into a suspension. In this regard, the slurrying or dispersing device 20 may also have at least one means 26 for receiving a dispersion or dissolution and/or suspension medium, more particularly water, serving both to slurry the product mixture and to convert the relevant chlorides of the further metals into a solution or suspension. Furthermore, the slurrying or dispersing device 20 ought to have at least one withdrawal means 27 for removing the preferably aqueous solution or suspension of the chlorides of the further metals.

In particular, the slurrying and/or dispersing device 20 may be a stirred tank or a stirred reactor or a countercurrent device, preferably having in each case at least one withdrawal means 27. The withdrawal means are used in particular for removing the preferably aqueous solution or suspension of the chlorides of the further metals, removed from the product mixture.

FIG. 4 further shows an inventive embodiment whereby the plant A also has at least one adding and/or supplying device 21, preferably with an adding means 22, more particularly for adding at least one complexing component for converting the noble metal, more particularly gold and/or silver, into a solution and/or suspension, preferably solution. In this connection, the complexing component may be selected from the group of cyanide liquor, iodine/bromine solution and thiosulfate solution.

As far as the adding device 21 is concerned, it ought to be arranged in operational direction downstream from the removing device 4, more particularly in operational direction downstream from the slurrying and/or dispersing device 20, and/or in operational direction upstream from the removing and/or filter device 5. The purpose of the adding or supplying device 21 is in particular to receive the product mixture freed from iron chloride, especially iron(III) chloride and also from the chlorides of the further metals.

In the adding or supplying device 21, by addition of the above-defined component, the noble metal present in the product mixture, more particularly gold and/or silver, is converted into a solution or suspension, and in this respect water in particular is used as dissolution or suspension medium. In this connection, the adding or supplying device 21 may optionally also have at least one means for receiving the dissolution or suspension medium, more particularly water.

The purpose of the adding or supplying device 21 is therefore in particular for adding and/or for contacting the component for converting the noble metal into a solution and/or dispersion to or with the product mixture, in particular the slurried or dispersed product mixture, which has been freed from iron chloride, especially iron(III) chloride, and also from the chlorides of the further metals.

For example, the adding and supplying device 21 may be a stirred tank or the like.

Furthermore, the inventive plant A may also have at least one extraction device 23, more particularly for removing and/or obtaining the noble metal, more particularly gold and/or silver, from the solution and/or suspension. In this connection, the extraction device may be a precipitating device and/or sorption device, more particularly adsorption device.

In particular, the extraction device 23 may be arranged in operational direction downstream of the removing and/or filter device 5.

For example, the extraction device 23 may be designed such that it has at least one means 28 for receiving a precipitant such as, in particular, particulate zinc or aluminum. The gold precipitated in this way can be removed and isolated via corresponding filter devices or sedimentation devices.

For the removal of the noble metal, it is also possible in general to use stirring devices, thickening devices and filtering devices, based for example on drum filters, more particularly drum vacuum filters.

The respective device or means of the recovery plant A of the invention may be connected to one another in order to ensure the underlying mass transport or material transport processes, via transport means that are known per se to the skilled person, based for example on conveying and/or belt transport means for transporting materials that are present in solid phase, and/or pipeline means for transporting substances that are in the gas phase.

Furthermore, the recovery plant of the invention may optionally have at least one further device for the further processing of the, in particular, solid product mixture that remains after the removal of the noble metal, more particularly gold and/or silver. More particularly, the plant of the invention may have at least one device for removing silicon dioxide and/or at least one device for reducing silicon dioxide to give elemental silicon.

Overall, in the present invention, with the recovery plant A according to the invention, an efficient system is provided for the processing especially of pyrite cinder, such as roasted pyrites, this system allowing the selective removal or isolation of different raw materials with economic-industrial relevance. In particular, the recovery plant A of the invention permits efficient implementation of the method according to the invention, especially in relation to recycling of the chlorinating agent, with reduced use of chemicals and energy overall.

The present invention relates in particular as well to a recovery plant A, preferably as defined above, more particularly for obtaining raw material from ores and/or ore residues, preferably for recovering metals from ores and/or ore residues, more preferably for recovering metals from pyrite residues, very preferably from roasted pyrites obtained in the production of sulfuric acid, more particularly a recovery plant A for implementing the method defined above, where the recovery plant A comprises:

(a) at least one providing and/or processing device 1, more particularly for the providing, more particularly processing, of a starting material in the form of at least one ore and/or ore residue, more particularly of at least one pyrite residue, preferably of one or more roasted pyrites obtained in the production of sulfuric acid, in particular where the starting material comprises iron, at least one noble metal and at least one further metal;

(b) at least one oxidation and/or roasting device 2, more particularly for the oxidation treatment, more particularly calcining and/or oxidative roasting, of the provided starting material, more particularly to give iron oxide and optionally oxides of the further metals as oxidation products in the resulting product mixture;

(c) at least one chlorinating device 3, more particularly for the chlorination of the oxidation products, more particularly oxides, in the product mixture and/or for the use of at least one chlorinating agent, more particularly recyclable chlorinating agent, preferably for the chlorination of iron oxide and optionally of the oxides of the further metals, more particularly to give iron chloride and optionally chlorides of the further metals in the product mixture, where the recovery plant A has at least one reaction and/or condensation device 10, more particularly for combining and/or contacting and for reacting, in particular, gaseous ammonia ($NH_3$) on the one hand and at least one preferably inorganic chloride compound, more particularly hydrogen chloride (HCl), on the other hand, to give recycled chlorinating agent, preferably ammonium chloride ($NH_4Cl$), in particular where the reaction and/or condensation device 10 is connected to the chlorinating apparatus 3 (the latter in particular for receiving ammonia ($NH_3$) from the chlorinating device 3 and in particular for delivering recycled chlorinating agent, more particularly ammonium chloride, into the chlorinating device 3);

(d) at least one removing device 4, more particularly for the removing of the chlorinated products, more particularly of iron chloride and optionally chlorides of the further metals, from the product mixture, where the removing device (4) is designed as sublimation device, where the recovery plant A, more particularly subsequent to and/or in operating direction downstream of the removing device 4, has at least one desublimation device 14, more particularly for receiving and desubliming iron chloride, more particularly sublimed iron chloride, and/or to give, in particular, solid and/or purified iron chloride, in particular when the desublimation device 14 is connected to the removing device 4 (the latter in particular for receiving, in particular, gaseous iron chloride from the removing device 4) and/or where the recovery plant A, more particularly subsequent to and/or in operating direction downstream of the removing device 4, has at least one reduction device 15, more particularly for reducing iron chloride, more particularly sublimed iron chloride, more particularly iron(III) chloride ($FeCl_3$), and to give metallic iron and/or to give at least one inorganic chlorine compound, more particularly hydrogen chloride (HCl), in particular where the reduction device 15 is connected to the removing device 4 (the latter in particular for receiving, in particular, gaseous iron chloride from the removing device 4), and/or in particular where the reduction device 15 is connected to the reaction and/or condensation device 10; (the latter in particular for delivering at least one inorganic chlorine compound into the reaction and/or condensation device 10); and (e) optionally at least one removing and/or filter device 5, more particularly for the removing of the noble metal, more particularly of gold and/or silver, from the product mixture freed from iron chloride and optionally chlorides of the further metals;

where the above-stated apparatus 1, 2, 3, 4, 5 are arranged in the order indicated downstream of one another in the operating direction, and where the above-stated devices 10, 14, 15 are arranged as defined above.

Lastly, the present invention—according to a further aspect of the present invention—relates to the use of a recovery plant A, more particularly as defined above, in a method for obtaining raw material from ores and/or ore residues, more particularly in a method for recovering metals from ores and/or ore residues, preferably from pyrite residues, more preferably from roasted pyrites obtained in the production of sulfuric acid, more particularly as defined above.

Further refinements, adaptations, variations, modifications, peculiarities and advantages of the present invention are readily perceptible and realizable for the skilled person on reading the description, without departing the scope of the present invention.

The present invention is illustrated using the exemplary embodiment hereinafter, which is not, however, intended in any way to restrict the present invention.

WORKING EXAMPLE

Implementation of the method of the invention according to one preferred embodiment of the present invention:

The method of the invention may be carried out, according to one specific embodiment of the present invention, as described hereinafter:

1. Provision of the Raw Material:

Raw material used is a pyrite residue in the form of roasted pyrites originating from sulfuric acid production, in a quantity of 1000 kg. The raw material used is first subjected to drying at 120° C. A sample of the raw material is analyzed using a mass spectrometer with inductively coupled plasma (ICP; ELAN model DRC) for its elemental composition. The starting material comprises the following elemental constituents, the corresponding mass fractions being based on the respective element:

| Element | Mass fraction |
|---------|---------------|
| Fe | 52 wt % |
| Au | 2 g/t |
| Ag | 10 g/t |
| Cu | 0.2 wt % |
| Zn | 0.4 wt % |
| Pb | 0.04 wt % |
| Co | 0.01 wt % |
| Si | 7 wt % |
| Ca | 4.4 wt % |

A further analysis of the starting material used shows that 65% of the iron is present in the form of iron(II, III) oxide ($Fe_3O_4$) and 35% of the iron in the form of iron(II) oxide ($Fe_2O_3$). Moreover, silicon is present in the form of silicon oxide, and calcium in the form of calcium sulfate. The further metals, apart from gold, are in the form of their oxides.

The starting material obtained by drying is further processed as follows:

2. Oxidation Treatment of the Starting Material:

The dried starting material is subsequently subjected to an oxidation treatment or calcining (oxidative roasting). For this purpose, the starting material is heated to a temperature of 700° C. The roasting, in particular, converts iron into the trivalent form, to give iron(III) oxide ($Fe_2O_3$). The product mixture obtained is further analyzed for its composition. The product mixture obtained after the oxidation treatment comprises iron now at least substantially completely in the form of iron(III) oxide ($Fe_2O_3$). The remaining metals, apart from gold and calcium, are in the form of oxides, more particularly in the highest oxidation state of the respective metals.

3. Chlorination of Iron and of the Further Metals:

The oxidation products obtained above, especially based on iron(III) oxide, and also the oxides of the further metals, such as copper, zinc, lead and cobalt, and also silver, are subjected to a chlorination, for which purpose solid or pulverulent ammonium chloride ($NH_4Cl$) is added to the resulting product mixture. The resultant mixture is heated to a temperature of 300° C. At this temperature, iron(III) oxide is converted to iron(III) chloride ($FeCl_3$), with release of ammonia and water. The resulting gaseous ammonia is removed or drawn off and used for the recycling of the chlorinating agent, as described in section 6.).

The chlorination also results in the chlorides of the further metals, especially copper chloride, zinc chloride, lead chloride and cobalt chloride, and also, where appropriate, silver chloride (at least in part).

4. Removal of Iron Chloride and of the Chlorides of the Further Metals from the Product Mixture:

For the selective sublimation of iron(III) chloride ($FeCl_3$), the product mixture obtained after the chlorination is heated to a temperature of 350° C., with iron(III) chloride being transferred into the gas phase and being able to be taken off or removed for corresponding further processing. Because of the sublimation temperatures different from iron(III) chloride, the chlorides of the further metals initially remain at least substantially in the solid product mixture. Also remaining in the product mixture are the corresponding noble metals, and also silicon dioxide and calcium sulfate.

The chlorides of the further metals are subsequently removed from the remaining product mixture by slurrying or dispersing of the product mixture in water, with the chlorides of the further metals (substantially with the exception of silver chloride) going into solution in water, on account of their good solubility properties, and in this way being removed or isolated. The chlorides of the further metals, isolated in this way, may be separated further, by means of selective sedimentation or precipitation, or on the basis of electrochemical or sorptive techniques, more particularly adsorptive techniques, for example. In particular, from the chlorides isolated in this way, it is also possible to obtain the metals as such (by reduction, for example). In this way, in particular, the metals copper, zinc, cobalt and lead are removed, while the noble metals (gold and silver) remain in the solid residue on account of their insolubility.

An analysis conducted for the remaining product mixture reveals that on the basis of the procedure according to the invention, the amount of iron and also of the further metals in the remaining product mixture or residue can be reduced by more than 90%. This results equally in a concentration or enrichment of the noble metal components, especially of gold and/or silver, in the remaining product mixture. Hence, in relation to the remaining product mixture, freed both from iron chloride and from the chlorides of the metals, it is possible to find a gold content of around 6 g/t and a silver content of around 30 g/t (whereas the starting material contains about 2 g/t gold and 10 g/t silver).

5. Processing of Iron(III) Chloride ($FeCl_3$):

The iron chloride removed before by sublimation can be desublimed, according to one first variant of the method of the invention, with cooling, to give solid iron(III) chloride ($FeCl_3$). The resulting iron(III) chloride ($FeCl_3$) has a very high purity and can be marketed as a corresponding commercial product.

According to a second variant of the method of the invention, the sublimed iron(III) chloride may be subjected to reduction to give metallic iron. For this purpose, iron(III) chloride ($FeCl_3$) is reacted with a reducing agent in the form of hydrogen in the gas phase at temperatures of 600° C. This results in metallic iron and also hydrogen chloride. The resulting hydrogen chloride is removed or taken off for the recycling of the chlorinating agent, as described in section 6.).

The iron obtained on reduction is further analyzed by means of x-ray fluorescence methods. The metallic iron obtained in the manner described above has a purity of at least 99.9%. According to this variant of the invention, therefore, high-purity metallic iron is provided as a corresponding commercial product.

6. Recycling of the Chlorinating Agent:

The gaseous ammonia resulting in the chlorination of iron oxide or of the oxides of the further metals (cf. observations in section 3.)) and drawn off is combined with the hydrogen chloride resulting from the reduction of iron(III) chloride (cf. observations in 5.)) and drawn off, and is reacted in the gas phase, thereby producing recycled ammonium chloride ($NH_4Cl$), which can be supplied again to the chlorinating operation in accordance with section 3.).

7. Recovery of the Noble Metals:

With regard to the remaining product mixture, present in solid or insoluble form and freed from iron chloride and also from the chlorides of the further metals, this mixture is subjected to a further purification, particularly for the purpose of obtaining the noble metals. Accordingly, the remaining product mixture, which optionally is again slurried or dispersed, can be admixed with cyanide liquor, thereby converting the noble metals present in the product mixture into a water-soluble form, by means of a complexation reaction. The remaining product mixture is removed from this solution by filtration. The noble metal components, in the form of gold and/or silver, can be obtained from the solution by precipitation methods, using zinc dust or the like, for example, to give purified or isolated gold and/or silver. The yield of gold in this case, based on the starting material, is at least 90%.

8. Recovery of Silicon and Calcium Sulfate:

The remaining product mixture comprises silicon dioxide, which can be subjected to reduction to give silicon, and also calcium sulfate, which can be obtained in the same way.

On the basis of the method of the invention, extrapolated to 100 000 t of raw material in the form of roasted pyrites, as well as the noble metals gold and silver, it is also possible to obtain about 50 000 t of metallic iron and also about 30 000 t of a mixture based on silicon dioxide and calcium carbonate. With the method of the invention it is possible in particular to provide commercial products both in the form of metallic iron and in the form of iron(III) chloride. Moreover, it is possible to provide products based on the chlorides of the further metals, as indicated above, and/or the metals as such (in particular by reduction). The substances obtained are notable in particular for a high purity. The method of the invention therefore permits an extensive and, moreover, selective processing of roasted pyrites. Not least on account of the recycling of the chlorinating agent used in accordance with the invention, the method of the invention displays a high overall economy and also improved environmental qualities.

LIST OF REFERENCE SYMBOLS

A Recovery plant
1 Providing and/or processing device
2 Oxidation and/or roasting device
3 Chlorinating device
4 Removing device
5 Removing and/or filter device
6 Comminuting means
7 Drying means
8 Supplying means of the chlorinating device
9 Takeoff and/or removal means of the chlorinating device
10 Reaction and/or condensation device
11 Supplying means of the reaction and/or condensation device
12 Further supplying means of the reaction and/or condensation device
13 Takeoff and/or removal means of the reaction and/or condensation device
14 Desublimation device
15 Reduction device
16 Supplying means of the reduction device
17 Further supplying means of the reduction device
18 Withdrawal and/or exporting means of the reduction device
19 Supplying means of the desublimation device
20 Slurrying and/or dispersing device
21 Adding and/or supplying device
22 Adding means of the adding and/or supplying device
23 Extraction device
24 Common device
25 Means for iron chloride takeoff in the removing device
26 Means for receiving a dissolving and/or suspending medium in the slurrying and/or dispersing device
27 Withdrawal means of the slurrying and/or dispersing device
28 Means for receiving a precipitant in the extraction device

The invention claimed is:

1. A method for obtaining metals from ores or ore residues in the form of pyrite residues,
wherein the method comprises the following steps (a) to (e) carried out in the order indicated hereinafter:
(a) providing a starting material in the form of at least one ore or ore residue, wherein the starting material comprises:
(i) iron,
(ii) at least one noble metal selected from the group consisting of gold, silver and combinations thereof, and
(iii) at least one further metal selected from the group consisting of copper, zinc, lead, cobalt, titanium, manganese, vanadium, chromium and combinations thereof;
(b) an oxidation treatment comprising the step of calcining or oxidative roasting of the starting material in the presence of at least one oxidizing agent to form oxidation products in the form of iron oxide and oxides of the further metals;
(c) a chlorination of the oxidation products obtained in step (b) by contacting the iron oxide and oxides of the further metals with at least one chlorinating agent, the chlorination comprising the chlorination of the iron oxide and of the oxides of the further metals to form a product mixture including iron chloride and chlorides of the further metals;
(d) removing the iron chloride and the chlorides of the further metals obtained in step (c) from the product mixture obtained in step (c) to form a further product mixture;
(e) removing the noble metal(s) from the further product mixture obtained in step (d);
wherein in step (c) the chlorination is carried out as a solid phase reaction and wherein in step (c) the chlorinating agent is a recyclable chlorinating agent, wherein the recyclable chlorinating agent used in step (c) is recycled by recovery or removal of the product mixture resulting from the chlorinating agent after the chlorination of the oxidation products and by subsequent reaction of these reaction products with a chlorine-containing compound and wherein the recycling of the chlorinating agent is carried out in a reaction- or condensation-device; and
wherein the step of chlorination, carried out in step (c), of the oxidation products obtained in step (b), on the one hand, and the step of removing the iron chloride, carried out in step (d), both take place in a common device, wherein the common device has a first section for the implementation of step (c) and a second section for the removing the iron chloride.

2. The method as claimed in claim 1,
wherein the starting material comprises the following ingredients, calculated in each case as element and based in each case on the dry weight of the starting material:
iron in amounts in the range from 10 wt % to 75 wt %;
gold in amounts in the range from 0.1 g/t to 15 g/t;
silver in amounts in the range from 1 g/t to 300 g/t.

3. The method as claimed in claim 1,
wherein the starting material comprises the following ingredients, calculated as element and based in each case on the dry weight of the starting material:
copper in the range from 0.01 wt % to 5 wt %;
zinc in the range from 0.02 wt % to 10 wt %;
lead in the range from 0.01 wt % to 5 wt %;
cobalt in the range from 0.001 wt % to 2 wt %;
titanium in the range from 0.001 wt % to 2 wt %;
manganese in the range from 0.001 wt % to 2 wt %;
vanadium in the range from 0.001 wt % to 2 wt %;
chromium in the range from 0.001 wt % to 2 wt %;
silicon in the range from 0.5 wt % to 30 wt %.

4. The method as claimed in claim 1, wherein in step (a) or before implementation of method step (b), the starting material is comminuted and homogenized.

5. The method as claimed in claim 1, wherein in method step (b) the oxidation treatment is carried out as a solid phase reaction and at temperatures in the range from 500° C. to 1000° C.

6. The method as claimed in claim 1,
wherein, in the oxidation treatment in step (b), iron is converted into iron(III) oxide.

7. The method as claimed in claim 1,
wherein the product mixture obtained in the oxidation treatment in step (b) comprises iron(III) oxide in the range from 10 wt % to 95 wt %, based on the dry weight of the product mixture obtained in step (b).

8. The method as claimed in claim 1,
wherein in step (c) the chlorination is carried out at temperatures in the range from 100° C. to 320° C.

9. The method as claimed in claim 1,
wherein in method step (c) iron in the form of iron(III) oxide is reacted to form iron chloride.

10. The method as claimed in claim 1,
wherein in step (c) the at least one noble metal and the at least one further metal each in the form of their oxides are contacted with at least one chlorinating agent to form the product mixture including iron chloride and chlorides of the further metals.

11. The method as claimed in claim 1,
wherein in step (c) the chlorination is carried out using ammonium chloride ($NH_4Cl$) as chlorinating agent.

12. The method as claimed in claim 1,
wherein the chlorinating agent used in step (c) in the form of ammonium chloride ($NH_4Cl$) is recycled by recovery via subsequent reaction; and
wherein the recycled chlorinating agent is subsequently used in step (c).

13. The method as claimed in claim 1,
wherein in step (d) iron chloride is removed and isolated from the product mixture obtained in step (c) via sublimation, followed by a subsequent reduction to give metallic iron or, alternatively, followed by a subsequent desublimation to give solid and purified iron chloride; and
wherein in step (d), after removing the iron chloride, a further subsequent removing and isolating of the chlorides of the further metals from the product mixture takes place.

14. The method as claimed in claim 1,
wherein the further product mixture obtained in step (d), calculated in each case as element and based in each case on the dry weight of the product mixture, comprises gold in the range from 1 g/t to 50 g/t and silver in the range from 2 g/t to 600 g/t; and
wherein in step (e) the noble metals are removed from the further product mixture in a liquid medium.

* * * * *

UNITED STATES PATENT AND TRADEMARK OFFICE
CERTIFICATE OF CORRECTION

PATENT NO. : 10,125,409 B2
APPLICATION NO. : 14/891856
DATED : November 13, 2018
INVENTOR(S) : Bertram Böhringer et al.

Page 1 of 1

It is certified that error appears in the above-identified patent and that said Letters Patent is hereby corrected as shown below:

In the Claims

Column 42, Line 54, please delete "on the one hand" after "(b),".

Column 43, Line 18, please delete "method" after "in".

Column 43, Line 33, please delete "method" after "in".

Signed and Sealed this
Twenty-fifth Day of December, 2018

Andrei Iancu
*Director of the United States Patent and Trademark Office*